(12) United States Patent
Lee et al.

(10) Patent No.: US 12,481,457 B2
(45) Date of Patent: Nov. 25, 2025

(54) OPERATING METHOD OF MEMORY DEVICE FOR MANAGING MAP DATA OF EACH OF PLURALITY OF STORAGE DEVICES, COMPUTING SYSTEM INCLUDING MEMORY DEVICE, AND OPERATING METHOD OF COMPUTING SYSTEM

(71) Applicant: SAMSUNG ELECTRONICS CO., LTD., Suwon-si (KR)

(72) Inventors: Jae-Gon Lee, Suwon-si (KR); Kyunghan Lee, Suwon-si (KR); Chon Yong Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 46 days.

(21) Appl. No.: 18/134,359

(22) Filed: Apr. 13, 2023

(65) Prior Publication Data

US 2023/0359394 A1    Nov. 9, 2023

(30) Foreign Application Priority Data

May 6, 2022    (KR) .................... 10-2022-0056187

(51) Int. Cl.
*G06F 3/06* (2006.01)

(52) U.S. Cl.
CPC .......... *G06F 3/0659* (2013.01); *G06F 3/0625* (2013.01); *G06F 3/0631* (2013.01); *G06F 3/0679* (2013.01)

(58) Field of Classification Search
CPC .... G06F 3/0659; G06F 3/0625; G06F 3/0631; G06F 3/0679; G06F 3/0607; G06F 3/0635; G06F 3/0664; G06F 3/0688; G06F 13/42; G06F 12/0646; G06F 13/382; G06F 12/0238; G06F 12/0802; G06F 12/1009

See application file for complete search history.

(56) References Cited

U.S. PATENT DOCUMENTS

| | | | |
|---|---|---|---|
| 8,166,202 B2 | 4/2012 | Matsuda | |
| 8,738,888 B2 | 5/2014 | Yamada et al. | |
| 10,409,511 B1* | 9/2019 | Subbarao | G06F 3/0607 |
| 10,896,089 B2 | 1/2021 | Helmick et al. | |

(Continued)

FOREIGN PATENT DOCUMENTS

| KR | 10-2018-0054394 A | 5/2018 |
|---|---|---|
| KR | 10-2022-0056187 A | 5/2022 |

OTHER PUBLICATIONS

Communication dated Aug. 25, 2025, issued by European Patent Office in European Patent Application No. 23171249.8.

*Primary Examiner* — Hosain T Alam
*Assistant Examiner* — Subir Kumar Chowdhury
(74) *Attorney, Agent, or Firm* — Sughrue Mion, PLLC

(57) ABSTRACT

An operating method of a memory device which communicates with a first storage device and a second storage device through an interface circuit is provided. The method includes receiving, from a host device, a first request including a command and a first logical block address; obtaining, based on the first logical block address, a first physical block address with reference to first map data dedicated for the first storage device; and sending, to the first storage device through the interface circuit, a second request including the first physical block address and the command.

20 Claims, 13 Drawing Sheets

(56) References Cited

U.S. PATENT DOCUMENTS

| | | | |
|---|---|---|---|
| 10,992,751 B1 | 4/2021 | Cudak et al. | |
| 11,226,895 B2 | 1/2022 | Lee | |
| 12,215,509 B2 | 2/2025 | Wiesenack et al. | |
| 2011/0099325 A1* | 4/2011 | Roh | G06F 3/0679 |
| | | | 711/E12.008 |
| 2017/0003889 A1 | 1/2017 | Kim et al. | |
| 2018/0136875 A1 | 5/2018 | Nimmagadda et al. | |
| 2020/0264985 A1* | 8/2020 | Lee | G06F 12/0246 |
| 2020/0310958 A1 | 10/2020 | Han et al. | |
| 2021/0089225 A1 | 3/2021 | Boyd | |
| 2021/0173785 A1* | 6/2021 | Jin | G06F 12/0246 |
| 2021/0232343 A1* | 7/2021 | Kim | G06F 3/0659 |
| 2021/0311868 A1 | 10/2021 | Chen et al. | |
| 2021/0311871 A1 | 10/2021 | Malladi et al. | |
| 2021/0318980 A1 | 10/2021 | Pal et al. | |
| 2022/0100669 A1* | 3/2022 | Choe | G06F 12/0877 |
| 2022/0114087 A1* | 4/2022 | Kim | G06F 13/1673 |
| 2023/0087462 A1* | 3/2023 | Yoon | G06F 3/0658 |
| | | | 713/173 |

\* cited by examiner

OPERATING METHOD OF MEMORY DEVICE FOR MANAGING MAP DATA OF EACH OF PLURALITY OF STORAGE DEVICES, COMPUTING SYSTEM INCLUDING MEMORY DEVICE, AND OPERATING METHOD OF COMPUTING SYSTEM

CROSS-REFERENCE TO RELATED APPLICATION(S)

This application claims priority under 35 U.S.C. § 119 to Korean Patent Application No. 10-2022-0056187 filed on May 6, 2022, in the Korean Intellectual Property Office, the disclosure of which is incorporated by reference herein in its entirety.

BACKGROUND

Embodiments of the present disclosure described herein relate to a memory device, and more particularly, relate to a memory device managing map data of each of a plurality of storage devices.

A memory device stores data in response to a write request and outputs data stored therein in response to a read request. For example, the memory device is classified as a volatile memory device, which loses data stored therein when a power supply is interrupted, such as a dynamic random access memory (DRAM) device, a static RAM (SRAM) device, or a nonvolatile memory device, which retains data stored therein even when a power supply is interrupted, such as a flash memory device, a phase-change RAM (PRAM), a magnetic RAM (MRAM), or a resistive RAM (RRAM). The nonvolatile memory device may be used as a storage device storing a large amount of data.

In the related art, the number of storage devices capable of being connected with a host may be limited depending on an interface of the host. As such, it is difficult to implement a high-capacity solid state drive (SSD). That is, an SSD device including a plurality of storage devices may be required regardless of the limitation on the number of storage devices capable of being connected with the host.

SUMMARY

Embodiments of the present disclosure provide an operating method of a memory device managing map data of each of a plurality of storage devices, a computing system including the memory device, and an operating method of the computing system.

According to an aspect of an example embodiment, there is provided an operating method of a memory device which communicates with a first storage device and a second storage device through an interface circuit, the operating method including: receiving, from a host device, a first request including a command and a first logical block address; obtaining, based on the first logical block address, a first physical block address with reference to first map data dedicated for the first storage device; and sending, to the first storage device through the interface circuit, a second request including the first physical block address and the command.

According to an aspect of an example embodiment, there is provided a computing system including: a first storage device; a second storage device; a memory device storing a mapping table for managing first map data dedicated for the first storage device and second map data dedicated for the second storage device; and an interface circuit configured to communicate with the first storage device, the second storage device, and the memory device, wherein the memory device is configured to: receive, from a host device, a first request including a command and a first logical block address, obtain, based on the first logical block address, a first physical block address with reference to the first map data of the mapping table, and send, to the first storage device through the interface circuit, a second request including the first physical block address and the command.

According to an aspect of an example embodiment, there is provided an operating method of a computing system which includes a first storage device, a second storage device, a memory device, and an interface circuit communicating with the first storage device, the second storage device, and the memory device, the operating method including: receiving, by the memory device, a first request including a command and a first logical block address from a host device; obtaining, by the memory device, a first physical block address with reference to first map data dedicated for the first storage device, based on the first logical block address; and sending, by the memory device, a second request including the first physical block address and the command to the first storage device through the interface circuit.

BRIEF DESCRIPTION OF THE FIGURES

The above and other aspects and features of the present disclosure will become apparent by describing in detail embodiments thereof with reference to the accompanying drawings, in which.

DETAILED DESCRIPTION

Below, embodiments of the present disclosure will be described in detail and clearly to such an extent that one skilled in the art implements embodiment of the present disclosure easily. With regard to the description of the present disclosure, to make the overall understanding easy, like components will be marked by like reference signs/ numerals in drawings, and thus, additional description will be omitted to avoid redundancy.

Figure 1:
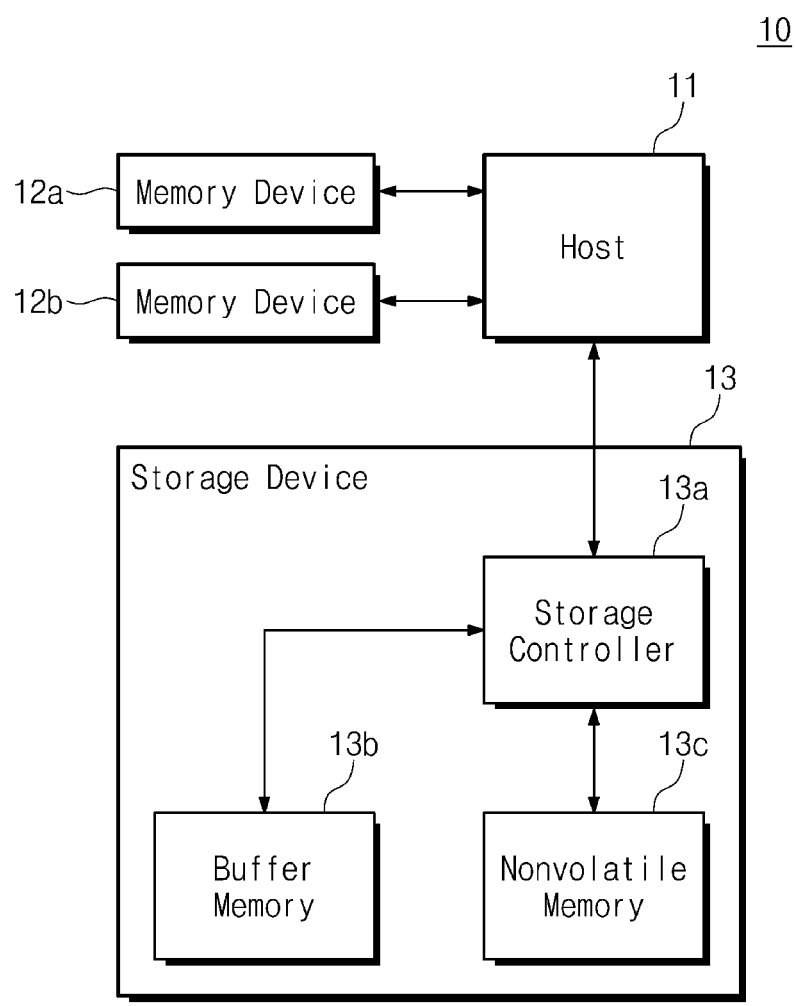
FIG. 1 is a block diagram of a computing system including a storage device.

FIG. 1 is a block diagram illustrating a computing system including a storage device. Referring to FIG. 1, a computing system 10 may include a host 11, a plurality of memory devices 12a and 12b, and a storage device 13. The host 11 may control an overall operation of the computing system 10. The plurality of memory devices 12a and 12b may be used as a working memory or a system memory of the host 11.

The storage device 13 may include a storage controller 13a, a buffer memory 13b, and a nonvolatile memory 13c. Under control of the host 11, the storage controller 13a may store data in the nonvolatile memory 13c or may send data stored in the nonvolatile memory 13c to the host 11.

The buffer memory 13b may store a variety of information necessary for the storage device 13 to operate. For example, the storage controller 13a may manage data stored in the nonvolatile memory 13c by using map data. The map data may include information about relationship between a logical block address managed by the host 11 and a physical block address of the nonvolatile memory 13c.

In an embodiment, the buffer memory 13b may be a high-speed memory such as a DRAM. As the capacity of the nonvolatile memory 13c increases, the size of necessary map data may increase. However, because the capacity of the buffer memory 13b included in the single storage device 13 is limited, it is impossible to cope with the increase in the size of the map data due to the increase in the capacity of the nonvolatile memory 13c.

Figure 2:
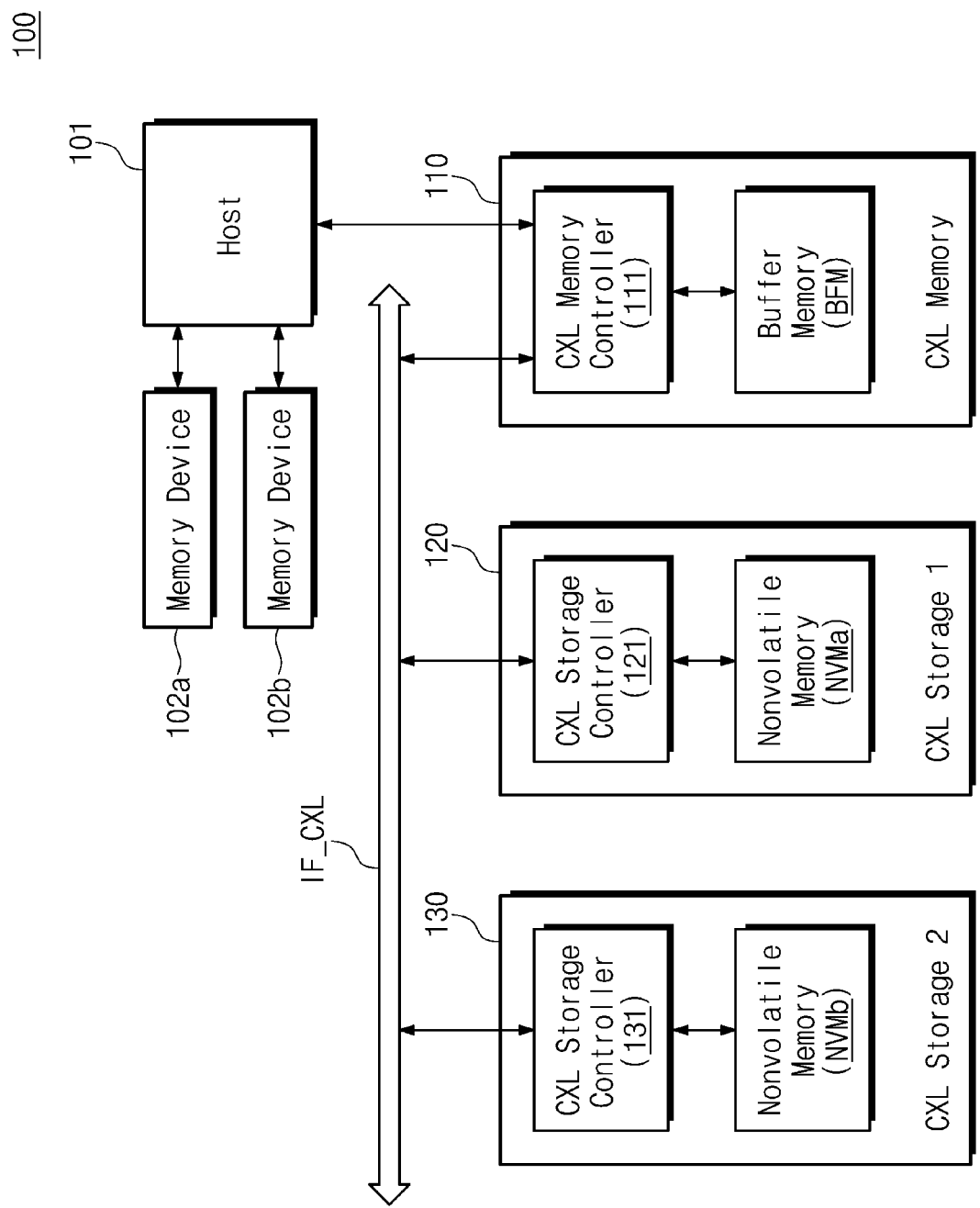
FIG. 2 is a block diagram of a computing system to which a storage device is applied.

FIG. 2 is a block diagram illustrating a computing system to which a storage system according to an embodiment of the present disclosure is applied. Referring to FIG. 2, a computing system 100 may include a host 101, a plurality of memory devices 102a and 102b, first Compute Express Link (CXL) storage 120, second CXL storage 130, and a CXL memory 110. In an embodiment, the computing system 100 may be included in user devices such as a personal computer, a laptop computer, a server, a media player, and a digital camera or automotive devices such as a navigation system, a black box, and an automotive electronic device/part. Alternatively, the computing system 100 may be a mobile system such as a mobile phone, a smartphone, a tablet personal computer (PC), a wearable device, a health care device, or an Internet of things (IoT) device.

The host 101 may control an overall operation of the computing system 100. In an embodiment, the host 101 may be one of various processors such as a central processing unit (CPU), a graphics processing unit (GPU), a neural processing unit (NPU), and a data processing unit (DPU). In an embodiment, the host 101 may include a single core processor or a multi-core processor.

The plurality of memory devices 102a and 102b may be used as a main memory or a system memory of the computing system 100. In an embodiment, each of the plurality of memory devices 102a and 102b may be a dynamic random access memory (DRAM) device and may have the form factor of the dual in-line memory module (DIMM). However, the present disclosure is not limited thereto. For example, the plurality of memory devices 102a and 102b may include a nonvolatile memory such as a flash memory, a phase change RAM (PRAM), a resistive RAM (RRAM), or a magnetic RAM (MRAM).

The plurality of memory devices 102a and 102b may directly communicate with the host 101 through the DDR interface. In an embodiment, the host 101 may include a memory controller configured to control the plurality of memory devices 102a and 102b. However, the present disclosure is not limited thereto. For example, the plurality of memory devices 102a and 102b may communicate with the host 101 through various interfaces.

The first CXL storage 120 may include a first CXL storage controller 121 and a nonvolatile memory NVMa. Under control of the host 101, the first CXL storage controller 121 may store data in the nonvolatile memory NVMa or may send data stored in the nonvolatile memory NVMa to the host 101. In an embodiment, the nonvolatile memory NVMa may be a NAND flash memory, but the present disclosure is not limited thereto.

The second CXL storage 130 may include a second CXL storage controller 131 and a nonvolatile memory NVMb. Under control of the host 101, the second CXL storage controller 131 may store data in the nonvolatile memory NVMb or may send data stored in the nonvolatile memory NVMb to the host 101. In an embodiment, the second CXL storage 130 may be connected with the first CXL storage 120 in a cascade structure.

The CXL memory 110 may include a CXL memory controller 111 and a buffer memory BFM. Under control of the host 101, the CXL memory controller 111 may store data in the buffer memory BFM or may send data stored in the buffer memory BFM to the host 101. In an embodiment, the buffer memory BFM may be a DRAM, but the present disclosure is not limited thereto.

In an embodiment, the first CXL storage 120, the second CXL storage 130, and the CXL memory 110 may be configured to share the same interface. For example, the first CXL storage 120, the second CXL storage 130, and the CXL memory 110 may communicate with each other through a CXL interface IF_CXL. In an embodiment, the CXL interface IF_CXL may indicate a low-latency and high-bandwidth link that supports coherency, memory access, and dynamic protocol muxing of IO protocols such that various connections between accelerators, memory devices, or various electronic devices are possible.

In an embodiment, unlike the storage device 13 of FIG. 1, each of the first CXL storage 120 and the second CXL storage 130 may not include a separate buffer memory for storing or managing map data. In this case, each of the first CXL storage 120 and the second CXL storage 130 may require a buffer memory for storing or managing the map data. In an embodiment, at least a partial area of the CXL memory 110 may be used as a buffer memory of each of the first CXL storage 120 and the second CXL storage 130.

In this case, a mapping table for managing map data dedicated for the first CXL storage 120 and map data dedicated for the second CXL storage 130 may be stored in the CXL memory 110. For example, at least a partial area of the CXL memory 110 may be allocated for a buffer memory of the first CXL storage 120 (i.e., for an area dedicated for the first CXL storage 120) by the host 101.

In an embodiment, the first CXL storage 120 may access the CXL memory 110 through the CXL interface IF_CXL. For example, the first CXL storage 120 may store the mapping table in the allocated area of the CXL memory 110 or may read the mapping table from the allocated area of the CXL memory 110. Under control of the first CXL storage 120, the CXL memory 110 may store data (e.g., the map data) in the buffer memory BFM or may send the data (e.g., the map data) stored in the buffer memory BFM to the first CXL storage 120.

In an embodiment, as in the first CXL storage 120, the second CXL storage 130 may access the CXL memory 110 through the CXL interface IF_CXL. For example, the second CXL storage 130 may store the mapping table in the allocated area of the CXL memory 110 or may read the mapping table from the allocated area of the CXL memory 110. Under control of the second CXL storage 130, the CXL memory 110 may store data (e.g., the map data) in the buffer memory BFM or may send the data (e.g., the map data) stored in the buffer memory BFM to the second CXL storage 130.

As described with reference to FIG. 1, the related art storage device 13 stores and manages the map data by using the buffer memory 13b included therein. As the capacity of the storage device 13 increases, the size of the map data increase, thereby causing an increase in the capacity of the buffer memory 13b included in the storage device 13. However, there is a limitation on an increase in capacity due to the structure and physical characteristic of the buffer memory 13b included in the storage device 13; in this case, the design change or additional integration of the buffer memory 13b is required.

In contrast, according to an embodiment of the present disclosure, the first CXL storage 120 may use at least a partial area of the CXL memory 110 placed outside the first CXL storage 120 as a buffer memory. Also, the second CXL storage 130 may use at least a partial area of the CXL memory 110 placed outside the second CXL storage 130 as a buffer memory. In this case, because the CXL memory 110 is implemented independently of the first CXL storage 120 and the second CXL storage 130, the CXL memory 110 may be implemented with a high-capacity memory. As such, even though the size of the map data increases due to an increase in the capacity of the first CXL storage 120 and the second CXL storage 130, the map data may be normally managed by the CXL memory 110.

In an embodiment, the storage controller 13a of the related art storage device 13 communicates with the host 11 through the host interface such as PCIe or NVMe, and communicates with the buffer memory 13b through the memory interface such as a DDR interface or an LPDDR interface. That is, the storage controller 13a of the related art storage device 13 communicates with the host 11 and the buffer memory 13b included therein, through different interfaces (i.e., heterogeneous interfaces).

In contrast, according to an embodiment of the present disclosure, the first CXL storage controller 121 of the first CXL storage 120 may communicate with the CXL memory 110 (i.e., a buffer memory) through the CXL interface IF_CXL, the second CXL storage controller 131 of the second CXL storage 130 may communicate with the CXL memory 110 (i.e., a buffer memory) through the CXL interface IF_CXL, and the CXL memory 110 may communicate with the host 101 through an interface different from the CXL interface IF_CXL. In other words, each of the first CXL storage controller 121 and the second CXL storage controller 131 may communicate with the CXL memory 110 through a homogeneous interface or a common interface and may use a partial area of the CXL memory 110 as a buffer memory.

Below, for convenience of description, it is assumed that the first CXL storage 120, the second CXL storage 130, and the CXL memory 110 communicate with each other through the CXL interface IF_CXL. However, the present disclosure is not limited thereto. For example, the first CXL storage 120, the second CXL storage 130, and the CXL memory 110 may communicate with each other based on various computing interfaces complying with the following: GEN-Z protocol, NVLink protocol, CCIX protocol, and Open CAPI protocol.

Also, for convenience of illustration, an example where the CXL memory 110 communicates with the first CXL storage 120 and the second CXL storage 130 through the CXL interface IF_CXL is illustrated, but the present disclosure is not limited thereto. For example, the CXL memory 110 may communicate with two or more CXL storages through the CXL interface IF_CXL. That is, the CXL memory 110 and the plurality of CXL storages may be connected through the CXL interface IF_CXL in the cascade structure.

Figure 3:
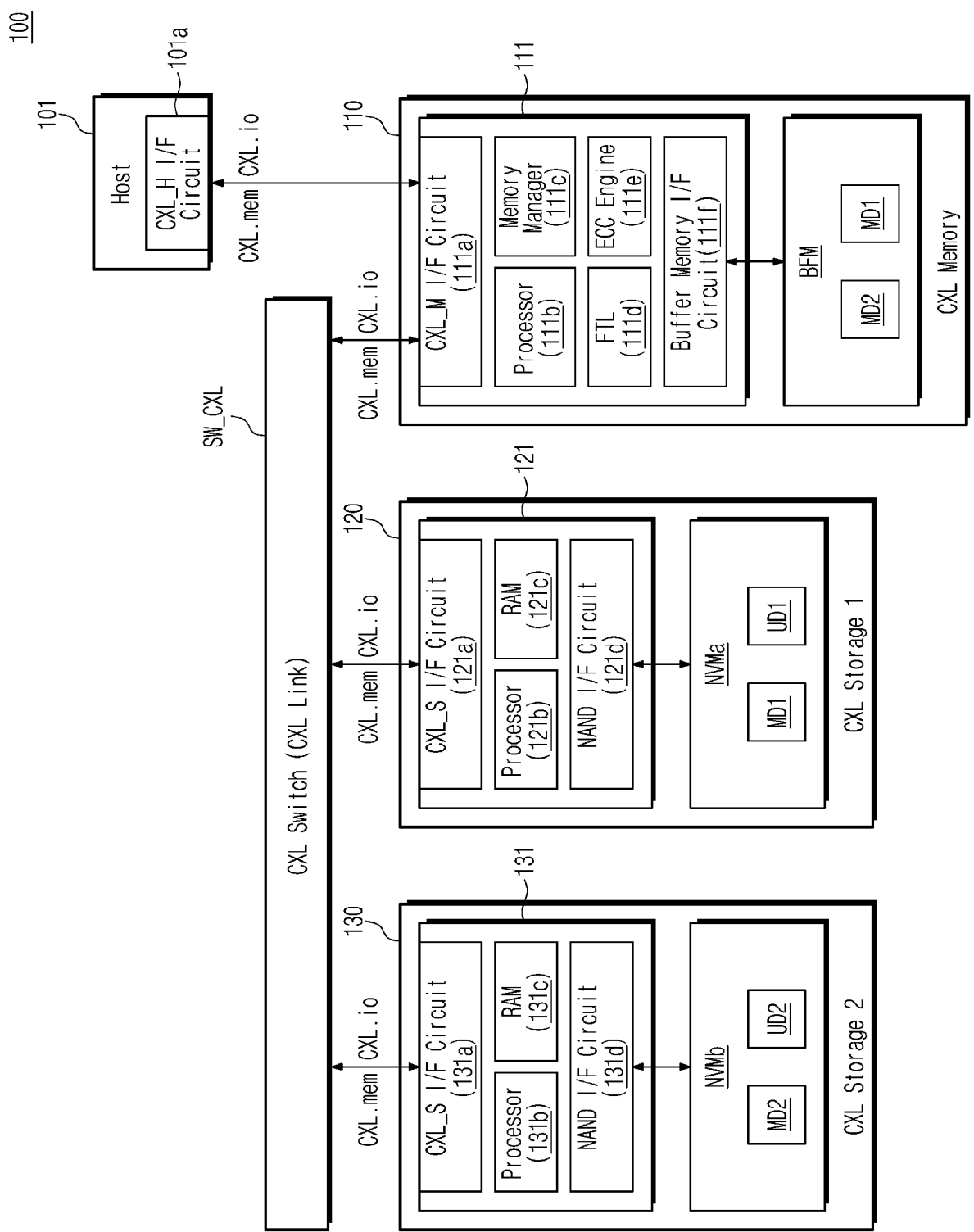
FIG. 3 is a block diagram illustrating a computing system of FIG. 2.

FIG. 3 is a block diagram illustrating components of a computing system of FIG. 2 in detail. Referring to FIGS. 2 and 3, the computing system 100 may include a CXL switch SW_CXL, the host 101, the first CXL storage 120, the second CXL storage 130, and the CXL memory 110.

The CXL switch SW_CXL may be a component included in the CXL interface IF_CXL. The CXL switch SW_CXL may be configured to arbitrate the communications between the first CXL storage 120, the second CXL storage 130, and the CXL memory 110. For example, in the case of storing data in the first CXL storage 120, the CXL switch SW_CXL may be configured to send information, which is provided from the CXL memory 110, such as a request, data, a response, or a signal, to the first CXL storage 120. In the case of storing data in the second CXL storage 130, the CXL switch SW_CXL may be configured to send information, which is provided from the CXL memory 110, such as a request, data, a response, or a signal, to the second CXL storage 130.

The host 101 may include a CXL host interface circuit 101a. The CXL host interface circuit 101a may communicate with the CXL memory 110.

In an embodiment, a configuration of the first CXL storage 120 may be different from configurations of related art storages. For example, a related art storage device (e.g., an SSD including a DRAM buffer) stores and manages map data in the DRAM buffer included in the related art storage device. In this case, a high-capacity DRAM buffer for storing the map data should be included in the related art storage device. Alternatively, another type of related art storage device (e.g., a DRAM-less SSD or a DRAM-less memory card) stores the entire map data in a nonvolatile memory (e.g., a NAND flash memory) included in the related art storage device and loads and uses a portion of the map data onto an SRAM buffer. In this case, to load the map data, the access to the nonvolatile memory whose operating speed is lower than that of the DRAM buffer is frequently performed, thereby reducing the performance of operation.

In contrast, each of the first CXL storage 120 and the second CXL storage 130 according to the present disclosure may not include a separate DRAM buffer configured to store the map data. In this case, each of the map data of the first CXL storage 120 and the map data of the second CXL storage 130 may be stored and managed in the CXL memory 110 placed outside the first CXL storage 120 and the second CXL storage 130. As will be described below, because the CXL memory 110 supports a fast operating speed, the first CXL storage 120 and the second CXL storage 130 may have the same performance as the related art storage device (e.g., a storage device including a DRAM). In addition, because the CXL memory 110 are placed outside the first CXL storage 120 and the second CXL storage 130, it may be possible to easily cope with a large amount of map data of each of the first CXL storage 120 and the second CXL storage 130.

The first CXL storage 120 may include the first CXL storage controller 121 and the nonvolatile memory NVMa.

The first CXL storage controller 121 may include a CXL storage interface circuit 121a, a processor 121b, a RAM 121c, and a NAND interface circuit 121d.

The CXL storage interface circuit 121a may be connected with the CXL switch SW_CXL. The CXL storage interface circuit 121a may communicate with the CXL memory 110 through the CXL switch SW_CXL.

The processor 121b may be configured to control an overall operation of the first CXL storage controller 121. The RAM 121c may be used as a working memory or a buffer memory of the first CXL storage controller 121. In an embodiment, the RAM 121c may be an SRAM and may be used as a read buffer and a write buffer for the first CXL storage 120. In an embodiment, as will be described below, the RAM 121c may be configured to temporarily store first map data MD1 read from the CXL memory 110 or a portion of the first map data MD1.

The NAND interface circuit 121d may control the nonvolatile memory NVMa such that data are stored in the nonvolatile memory NVMa or data are read from the nonvolatile memory NVMa. In an embodiment, the NAND interface circuit 121d may be implemented to comply with the standard protocol such as a toggle interface or ONFI. For example, the nonvolatile memory NVMa may include a plurality of NAND flash devices; in the case where the NAND interface circuit 121d is implemented based on the toggle interface, the NAND interface circuit 121d communicates with the plurality of NAND flash devices through a plurality of channels. The plurality of NAND flash devices may be connected with the plurality of channels through a multi-channel, multi-way structure.

The NAND interface circuit 121d may send a chip enable signal /CE, a command latch enable signal CLE, an address latch enable signal ALE, a read enable signal/RE and a write enable signal /WE to the plurality of NAND flash devices through the plurality of channels. The NAND interface circuit 121d and the plurality of NAND flash devices may exchange a data signal DQ and a data strobe signal DQS through the plurality of channels.

TABLE 1

| /CE | CLE | ALE | /WE | /RE | DQS | DQx | MODE | |
|---|---|---|---|---|---|---|---|---|
| L | H | L | ↑ | H | X | CMD | Command Input |
| L | L | H | ↑ | H | X | ADDR | Address Input |
| L | L | L | H | H | ↑↓ | DATA_in | Data Input |
| L | L | L | H | ↑↓ | ↑↓ | DATA_out | Data Output |

Table 1 shows operating modes of a NAND flash device according to a state of each signal. Referring to Table 1, while the NAND flash device receives a command CMD or an address ADDR or receives/outputs data "DATA", the chip enable signal /CE maintains a low state "L". During a command input mode, the NAND interface circuit 121d may control signal lines such that the command latch enable signal CLE has a high level "H", the address latch enable signal ALE has the low level "L", the write enable signal /WE toggles between the high level "H" and the low level "L" and the read enable signal /RE has the high level "H". During the command input mode, the NAND interface circuit 121d may send the command CMD to the NAND flash device through data signals DQx in synchronization with the rising edge ↑ of the write enable signal /WE. The NAND flash device may identify the command CMD from the data signals DQx in response to the rising edge ↑ of the write enable signal /WE. During an address input mode, the NAND interface circuit 121d may control signal lines such that the command latch enable signal CLE has the low level "L", the address latch enable signal ALE has the high level "H", the write enable signal /WE toggles between the high level "H" and the low level "L", and the read enable signal /RE has the high level "H". During the address input mode, the NAND interface circuit 121d may send the address ADDR to the NAND flash device through the data signals DQx in synchronization with the rising edge ↑ of the write enable signal /WE. The NAND flash device may identify the address ADDR from the data signals DQx in response to the rising edge ↑ of the write enable signal /WE. In an embodiment, the address ADDR may be a value corresponding to a physical block address of the NAND flash device.

During a data input mode, the NAND interface circuit 121d may control signal lines such that the command latch enable signal CLE has the low level "L", the address latch enable signal ALE has the low level "L", the write enable signal /WE has the high level "H", the read enable signal /RE has the high level "H", and the data strobe signal DQS toggles between the high level "H" and the low level "L". During the data input mode, the NAND interface circuit 121d may send the data "DATA" to the NAND flash device through the data signals DQx in synchronization with the rising edge ↑ and the falling edge ↓ of the data strobe signal DQS. The NAND flash device may identify the data "DATA" from the data signals DQx in response to the rising edge ↑ and the falling edge ↓ of the data strobe signal DQS.

During a data output mode, the NAND interface circuit 121d may control signal lines that the command latch enable signal CLE has the low level "L", the address latch enable signal ALE has the low level "L", the write enable signal /WE has the high level "H", and the read enable signal /RE toggles between the high level "H" and the low level "L". During the data output mode, the NAND flash device may generate the data strobe signal DQS toggling between the high level "H" and the low level "L" in response to the read enable signal /RE. The NAND flash device may send the data "DATA" to the NAND interface circuit 121d through the data signals DQx in synchronization with the rising edge ↑ and the falling edge ↓ of the data strobe signal DQS. The NAND interface circuit 121d may identify the data "DATA" from the data signals DQx in response to the rising edge ↑ and the falling edge ↓ of the data strobe signal DQS.

The toggle interface described above is an example, and the present disclosure is not limited thereto.

The nonvolatile memory NVMa may store or output first user data UD1 under control of the first CXL storage controller 121. The nonvolatile memory NVMa may store or output the first map data MP1 under control of the first CXL storage controller 121. In an embodiment, the first map data MD1 stored in the nonvolatile memory NVMa may include mapping information corresponding to the whole of the first user data UD1 stored in the nonvolatile memory NVMa. The first map data MD1 stored in the nonvolatile memory NVMa may be stored in the CXL memory 110 in the initialization operation of the first CXL storage 120.

The second CXL storage 130 may include the second CXL storage controller 131 and the nonvolatile memory NVMb. The second CXL storage controller 131 may include a CXL storage interface circuit 131a, a processor 131b, a RAM 131c, and a NAND interface circuit 131d. The CXL storage interface circuit 131a, the processor 131b, the RAM 131c, and the NAND interface circuit 131d may respectively correspond to the CXL storage interface circuit 121a, the processor 121b, the RAM 121c, and the NAND interface circuit 121d.

The CXL memory 110 may include the CXL memory controller 111 and the buffer memory BFM. The CXL memory controller 111 may include a CXL memory interface circuit 111a, a processor 111b, a memory manager 111c, a flash translation layer (FTL) 111d, an error correction code (ECC) engine 111e, and a buffer memory interface circuit 111f.

The CXL memory interface circuit 111a may be connected with the CXL switch SW_CXL. The CXL memory interface circuit 111a may communicate with the first CXL storage 120 and the second CXL storage 130 through the CXL switch SW_CXL. The CXL memory interface circuit 111a may communicate with the host 101.

The processor 111b may be configured to control an overall operation of the CXL memory controller 111. The memory manager 111c may be configured to manage the buffer memory BFM. For example, the memory manager 111c may be configured to translate a memory address (e.g., a logical address or a virtual address) from the first CXL storage 120 or the second CXL storage 130 into a physical address for the buffer memory BFM.

In an embodiment, the memory address that is an address for managing a storage area of the CXL memory 110 may be a logical address or a virtual address that is designated and managed by the host 101.

The FTL 111d may perform various management operations for efficiently using the nonvolatile memory NVMa. For example, the FTL 111d may perform address translation between a logical block address managed by the host 101 and a physical block address used in the nonvolatile memory NVMa, based on the mapping table. The FTL 111d may perform a bad block management operation for the nonvolatile memory NVMa. The FTL 111d may perform a wear leveling operation for the nonvolatile memory NVMa. The FTL 111d may perform a garbage collection operation for the nonvolatile memory NVMa.

In an embodiment, the FTL 111d may be implemented in the form of hardware, firmware, or software, or in the form of a combination thereof. In the case where the FTL 111d is implemented in the form of firmware or software, program codes associated with the FTL 111d may be stored in a RAM (not illustrated) in the CXL memory controller 111 and may be driven by the processor 111b. In the case where the FTL 111d is implemented in the form of hardware, hardware components configured to perform the above management operations may be implemented in the first CXL storage controller 121.

The ECC engine 111e may perform error detection and correction on data read from the nonvolatile memory NVMa. For example, the ECC engine 111e may generate parity bits for the user data UD to be stored in the nonvolatile memory NVMa, and the parity bits thus generated may be stored in the nonvolatile memory NVMa together with the user data UD. When the user data UD are read from the nonvolatile memory NVMa, the ECC engine 111e may detect and correct an error of the user data UD by using the parity bits read from the nonvolatile memory NVMa together with the user data UD.

The buffer memory interface circuit 111f may control the buffer memory BFM such that data are stored in the buffer memory BFM or data are read from the buffer memory BFM. In an embodiment, the buffer memory interface circuit 111f may be implemented to comply with the standard protocol such as a DDR interface or an LPDDR interface.

Under control of the CXL memory controller 111, the buffer memory BFM may store data or may output the stored data. In an embodiment, the buffer memory BFM may be configured to store the first map data MD1 that are used in the first CXL storage 120. When the computing system 100 or the first CXL storage 120 is initialized, the first map data MD1 may be transferred from the first CXL storage 120 to the CXL memory 110.

In an embodiment, the buffer memory BFM may be configured to store second map data MD2 that are used in the second CXL storage 130. When the computing system 100 or the second CXL storage 130 is initialized, the second map data MD2 may be transferred from the second CXL storage 130 to the CXL memory 110.

As described above, the first CXL storage 120 according to an embodiment of the present disclosure may store the first map data MD1, which are necessary to manage the nonvolatile memory NVMa, in the CXL memory 110 connected through the CXL switch SW_CXL (or the CXL interface IF_CXL). When the first CXL storage 120 performs the read operation depending on a request of the host 101, the first CXL storage 120 may read at least a portion of the first map data MD1 from the CXL memory 110 through the CXL switch SW_CXL (or the CXL interface IF_CXL) and may perform the read operation based on the first map data MD1 thus read. Alternatively, when the first CXL storage 120 performs the write operation depending on a request of the host 101, the first CXL storage 120 may perform the write operation on the nonvolatile memory NVMa and may update the first map data MD1. In this case, the first map data MD1 thus updated may be first stored in the RAM 121c of the in first CXL storage controller 121, and the first map data MD1 stored in the RAM 121c may be transferred to the buffer memory BFM of the CXL memory 110 through the CXL switch SW_CXL (or the CXL interface IF_CXL), so as to be updated in the buffer memory BFM. Also, as in the first CXL storage 120, the second CXL storage 130 according to an embodiment of the present disclosure may perform the write operation and the read operation by communicating with the CXL memory 110 and may transfer the second map data MD2 to the buffer memory BFM.

In an embodiment, at least a partial area of the buffer memory BFM of the CXL memory 110 may be allocated for a dedicated area of the first CXL storage 120 and a dedicated area of the second CXL storage 130, and the remaining area thereof may be used as an area that is capable of being accessed by the host 101.

In an embodiment, the host 101 and the CXL memory 110 may communicate with each other by using CXL.io protocol which is an input/output protocol. The CXL.io may have a PCIe-based non-coherency input/output protocol. The host 101 and the CXL memory 110 may exchange user data or variety of information with each other by using the CXL.io.

In an embodiment, the host 101 and the CXL memory 110 may communicate with each other by using CXL.mem protocol which is a memory access protocol. The CXL.mem may be a memory access protocol that supports memory access. The host 101 may access a partial area (e.g., an area where the first map data MD1 and the second map data MD2 are stored or a CXL storage-dedicated area) of the CXL memory 110 by using the CXL.mem.

In an embodiment, the first CXL storage 120 and the CXL memory 110 may communicate with each other by using the CXL.mem being the memory access protocol. The first CXL storage 120 may access a partial area (e.g., an area where the first map data MD1 are stored or a CXL storage-dedicated area) of the CXL memory 110 by using the CXL.mem.

In an embodiment, the first CXL storage 120 and the CXL memory 110 may communicate with each other by using the CXL.io being the input/output protocol. The first CXL storage 120 and the CXL memory 110 may exchange user data or variety of information with each other by using the CXL.io.

In an embodiment, the second CXL storage 130 and the CXL memory 110 may communicate with each other by using the CXL.mem being the memory access protocol. The second CXL storage 130 may access a partial area (e.g., an area where the second map data MD2 are stored or a CXL storage-dedicated area) of the CXL memory 110 by using the CXL.mem.

In an embodiment, the second CXL storage 130 and the CXL memory 110 may communicate with each other by using the CXL.io being the input/output protocol. The second CXL storage 130 and the CXL memory 110 may exchange user data or variety of information with each other by using the CXL.io.

The above access types including CXL.io and CXL.mem are provided as an example, and the present disclosure is not limited thereto.

In an embodiment, the first CXL storage 120, the second CXL storage 130, and the CXL memory 110 may be installed in a CXL interface-based physical port (e.g., a PCIe physical port). In an embodiment, the first CXL storage 120, the second CXL storage 130, and the CXL memory 110 may be implemented based on the E1.S, E1.L, E3.S, E3.L, or PCIe AIC (CEM) form factor. Alternatively, the first CXL storage 120, the second CXL storage 130, and the CXL memory 110 may be implemented based on the U.2 form factor, the M.2 form factor, various different types of PCIe-based form factors, or various different types of small form factors.

Figure 4:
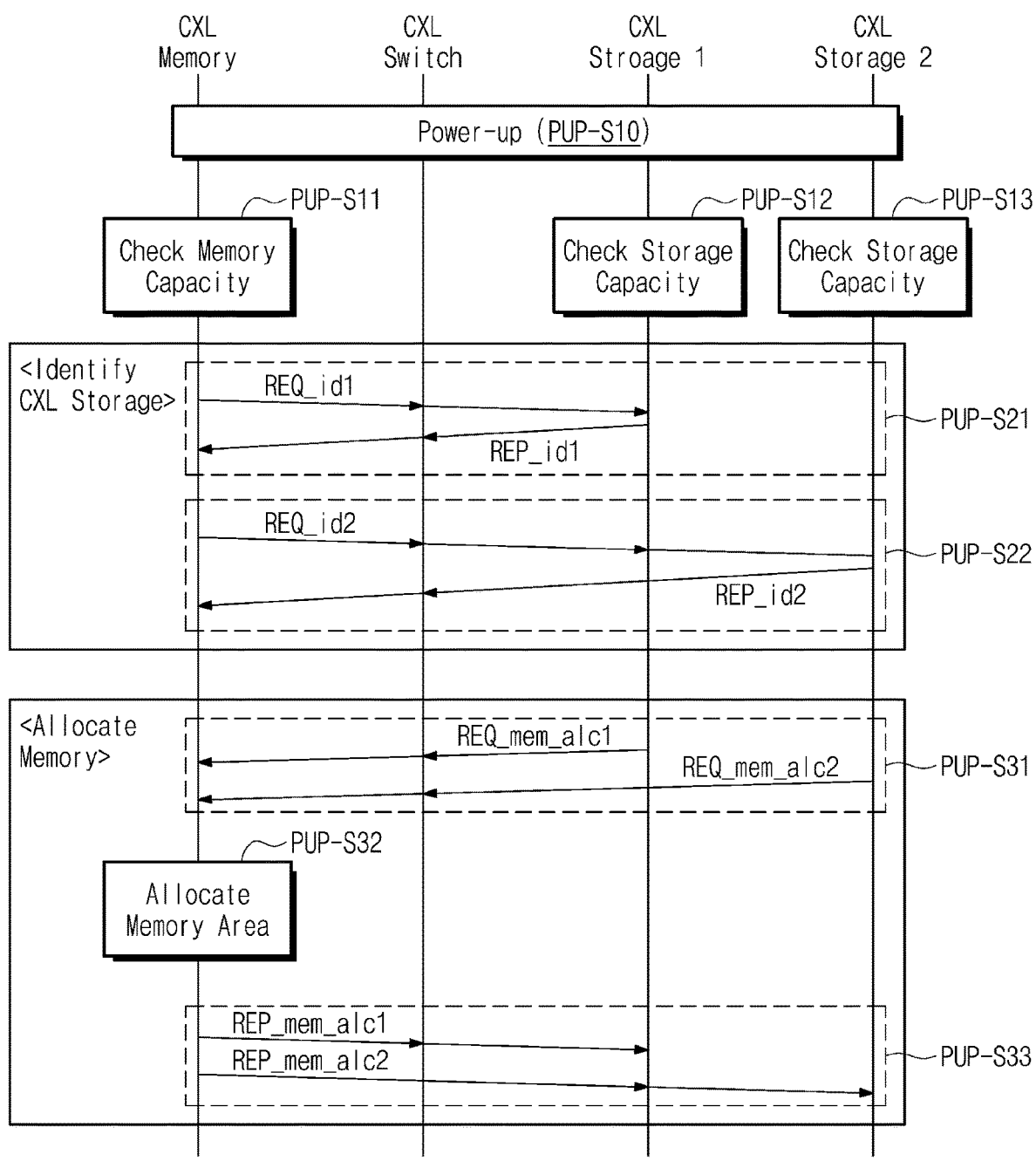
FIG. 4 is a flowchart describing an initialization operation or a power-up operation of a computing system of FIG. 3.

FIG. 4 is a flowchart describing an initialization operation or a power-up operation of a computing system of FIG. 3. FIG. 4 is a flowchart illustrating an initialization operation or a power-up operation of a computing system of FIG. 3. Referring to FIGS. 3 and 4, in operation PUP-S10, the computing system 100 may be powered up. When the computing system 100 is powered up, the host 101 may send information about power-up or initialization start to the CXL memory 110, the first CXL storage 120, the second CXL storage 130, and the CXL switch SW_CXL. In response to the information about power-up or initialization start, each of the CXL memory 110, the first CXL storage 120, the second CXL storage 130, and the CXL switch SW_CXL may perform the individual initialization operation.

In operation PUP-S11, the CXL memory 110 may check a memory capacity (i.e., a capacity of the buffer memory BFM). For example, the CXL memory 110 may check the capacity of the buffer memory BFM in response to the information about power-up or initialization start in operation PUP-S10.

In operation PUP-S12, the first CXL storage 120 may check a storage capacity (i.e., a capacity of the nonvolatile memory NVMa). For example, the first CXL storage 120 may check the storage capacity of the nonvolatile memory NVMa in response to the information about power-up or initialization start.

In operation PUP-S13, the second CXL storage 130 may check a storage capacity (i.e., a capacity of the nonvolatile memory NVMb). For example, the second CXL storage 130 may check the storage capacity of the nonvolatile memory NVMb in response to the information about power-up or initialization start.

The CXL memory 110 may recognize information of the first CXL storage 120 and the second CXL storage 130 through operation PUP-S21 and operation PUP-S22. For example, in operation PUP-S21, the CXL memory 110 may send a first device information request REQ_id1 for recognizing device information of the first CXL storage 120 through the CXL memory interface circuit 111a. The CXL switch SW_CXL may transfer the first device information request REQ_id1 to the first CXL storage 120 targeted for the first device information request REQ_id1.

The first CXL storage 120 may output a first device information response REP_id1 through the CXL storage interface circuit 121a in response to the first device information request REQ_id1 received from the CXL switch SW_CXL. The first device information response REP_id1 may be transferred to the CXL switch SW_CXL. The CXL switch SW_CXL may transfer the first device information response REP_id1 to the CXL memory 110 targeted for the first device information response REP_id1.

The CXL memory 110 may identify the device information of the first CXL storage 120 in response to the first device information response REP_id1 received from the CXL switch SW_CXL. In an embodiment, the first device information response REP_id1 may include information about a device type and a storage capacity of the first CXL storage 120.

For example, in operation PUP-S22, the CXL memory 110 may send a second device information request REQ_id2 for recognizing device information of the second CXL storage 130 through the CXL memory interface circuit 111a. The CXL switch SW_CXL may transfer the second device information request REQ_id2 to the second CXL storage 130 targeted for the second device information request REQ_id2.

The second CXL storage 130 may output a second device information response REP_id2 through the CXL storage interface circuit 131a in response to the second device information request REQ_id2 received from the CXL switch SW_CXL. The second device information response REP_id2 may be transferred to the CXL switch SW_CXL. The CXL switch SW_CXL may transfer the second device information response REP_id2 to the CXL memory 110 targeted for the second device information response REP_id2.

The CXL memory 110 may identify the device information of the second CXL storage 130 in response to the second device information response REP_id2 received from the CXL switch SW_CXL. In an embodiment, the second device information response REP_id2 may include information about a device type and a storage capacity of the second CXL storage 130.

For convenience of illustration, an example where operation PUP-S22 is performed after operation PUP-S21 is illustrated, but the present disclosure is not limited thereto. For example, operation PUP-S21 may be performed after operation PUP-S22, or operation PUP-S21 and operation PUP-S21 may be simultaneously performed.

An example where the CXL memory 110 communicates with the first CXL storage 120 and the second CXL storage 130 through the CXL interface IF_CXL is illustrated, but the present disclosure is not limited thereto. For example, the CXL memory 110 may communicate with two or more CXL storages through the CXL interface IF_CXL. That is, the CXL memory 110 and the plurality of CXL storages may be connected through the CXL interface IF_CXL in the cascade structure.

In an embodiment, as the host 101 recognizes the first CXL storage 120 and the second CXL storage 130 through the CXL memory 110 without direct communication with the first CXL storage 120 and the second CXL storage 130, the host 101 may recognize the CXL memory 110, the first CXL storage 120, and the second CXL storage 130 as one memory device.

Also, in the related art technology, the number of storage devices capable of being connected may be limited depending on the interface of the host 101; however, in the present disclosure, as a plurality of storage devices are connected through the CXL memory 110 and the CXL switch SW_CXL and the CXL memory 110 communicates with the host 101, storage devices may be connected with the CXL memory 110 as much as a necessary capacity, regardless of the limitation on the number of storage devices capable of being connected with the interface of the host 101. That is, the computing system 100 may include a high-capacity storage device.

The CXL memory 110 may allocate at least a partial area of the CXL memory 110 for an area dedicated for each of the first CXL storage 120 and the second CXL storage 130 through operation PUP-S31 to operation PUP-S33. For example, in operation PUP-S31, the first CXL storage 120 may output a first memory allocation request REQ_mem_alc1 through the CXL storage interface circuit 121a. The first memory allocation request REQ_mem_alc1 may be transferred to the CXL switch SW_CXL. The CXL switch SW_CXL may transfer the first memory allocation request REQ_mem_alc1 to the CXL memory 110. In an embodiment, the first memory allocation request REQ_mem_alc1 may refer to an allocation request for an area of the CXL memory 110, which is to be used as a dedicated area of the first CXL storage 120.

The second CXL storage 130 may output a second memory allocation request REQ_mem_alc2 through the CXL storage interface circuit 131a. The second memory allocation request REQ_mem_alc2 may be transferred to the CXL switch SW_CXL. The CXL switch SW_CXL may transfer the second memory allocation request REQ_mem_alc2 to the CXL memory 110. In an embodiment, the second memory allocation request REQ_mem_alc2 may refer to an allocation request for an area of the CXL memory 110, which is to be used as a dedicated area of the second CXL storage 130.

In operation PUP-S32, the CXL memory 110 may allocate at least a partial area of the CXL memory 110 for the dedicated area of the first CXL storage 120 in response to the first memory allocation request REQ_mem_alc1. For example, the CXL memory 110 may determine a buffer capacity required by the first CXL storage 120 based on the storage capacity of the first CXL storage 120. The CXL memory 110 may allocate the area of the CXL memory 110, which corresponds to the determined buffer capacity, for the dedicated area of the first CXL storage 120.

The CXL memory 110 may allocate at least a partial area of the CXL memory 110 for the dedicated area of the second CXL storage 130 in response to the second memory allocation request REQ_mem_alc2. For example, the CXL memory 110 may determine a buffer capacity required by the second CXL storage 130 based on the storage capacity of the second CXL storage 130. The CXL memory 110 may allocate the area of the CXL memory 110, which corresponds to the determined buffer capacity, for the dedicated area of the second CXL storage 130.

In operation PUP-S33, the CXL memory 110 may output a first memory allocation response REP_mem_alc1 through the CXL memory interface circuit 111a. The first memory allocation response REP_mem_alc1 may be transferred to the CXL switch SW_CXL. The CXL switch SW_CXL may transfer the first memory allocation response REP_mem_alc1 to the first CXL storage 120 targeted for the first memory allocation response REP_mem_alc1. In an embodiment, the first memory allocation response REP_mem_alc1 may include information about a device identifier of the CXL memory 110 and a memory address (e.g., a logical address range or a virtual address range) of an area of the CXL memory 110, which is allocated for a dedicated area of the first CXL storage 120. The first CXL storage 120 may identify the area of the CXL memory 110, which is dedicated for the first CXL storage 120, based on the first memory allocation response REP_mem_alc1.

The CXL memory 110 may output a second memory allocation response REP_mem_alc2 through the CXL memory interface circuit 111a. The second memory allocation response REP_mem_alc2 may be transferred to the CXL switch SW_CXL. The CXL switch SW_CXL may transfer the second memory allocation response REP_mem_alc2 to the second CXL storage 130 targeted for the second memory allocation response REP_mem_alc2. In an embodiment, the second memory allocation response REP_mem_alc2 may include information about a device identifier of the CXL memory 110 and a memory address (e.g., a logical address range or a virtual address range) of an area of the CXL memory 110, which is allocated for a dedicated area of the second CXL storage 130.

The second CXL storage 130 may identify the area of the CXL memory 110, which is dedicated for the second CXL storage 130, based on the second memory allocation response REP_mem_alc2.

For convenience of illustration, an example where the operation for the first CXL storage 120 is performed prior to the operation for the second CXL storage 130 is illustrated, but the present disclosure is not limited thereto. For example, the operation for the first CXL storage 120 may be performed after the operation for the second CXL storage 130, or the operation for the first CXL storage 120 and the operation for the second CXL storage 130 may be simultaneously performed.

In an embodiment, after partial areas of the CXL memory 110 are respectively allocated for the dedicated areas of the first CXL storage 120 and the second CXL storage 130, the first CXL storage 120 and the second CXL storage 130 may respectively output a first write request and a second write request to the CXL memory 110 through the CXL switch SW_CXL.

In an embodiment, the first write request may refer to a request for storing the first map data MD1 present in the nonvolatile memory NVMa of the first CXL storage 120 in the dedicated area of the CXL memory 110. That is, the first write request may include the first map data MD1 and address information about the dedicated area.

In an embodiment, the second write request may refer to a request for storing the second map data MD2 present in the nonvolatile memory NVMb of the second CXL storage 130 in the dedicated area of the CXL memory 110. That is, the second write request may include the second map data MD2 and address information about the dedicated area.

The CXL memory 110 may perform the write operation in response to the first write request. The CXL memory 110 may transfer a first write response providing notification that the first write request is completed, to the first CXL storage 120. The first CXL storage 120 may recognize that the write operation is completely performed on the CXL memory 110, in response to the first write response. That is, the whole of the first map data MD1 of the first CXL storage 120 may be stored in the CXL memory 110.

The CXL memory 110 may perform the write operation in response to the second write request. The CXL memory 110 may transfer a second write response providing notification that the second write request is completed, to the second CXL storage 130. The second CXL storage 130 may recognize that the write operation is completely performed on the CXL memory 110, in response to the second write response. That is, the whole of the second map data MD2 of the second CXL storage 130 may be stored in the CXL memory 110.

Afterwards, the first CXL storage 120, the second CXL storage 130, and the CXL memory 110 may perform a normal operation (e.g., a read operation or a write operation).

Figure 5:
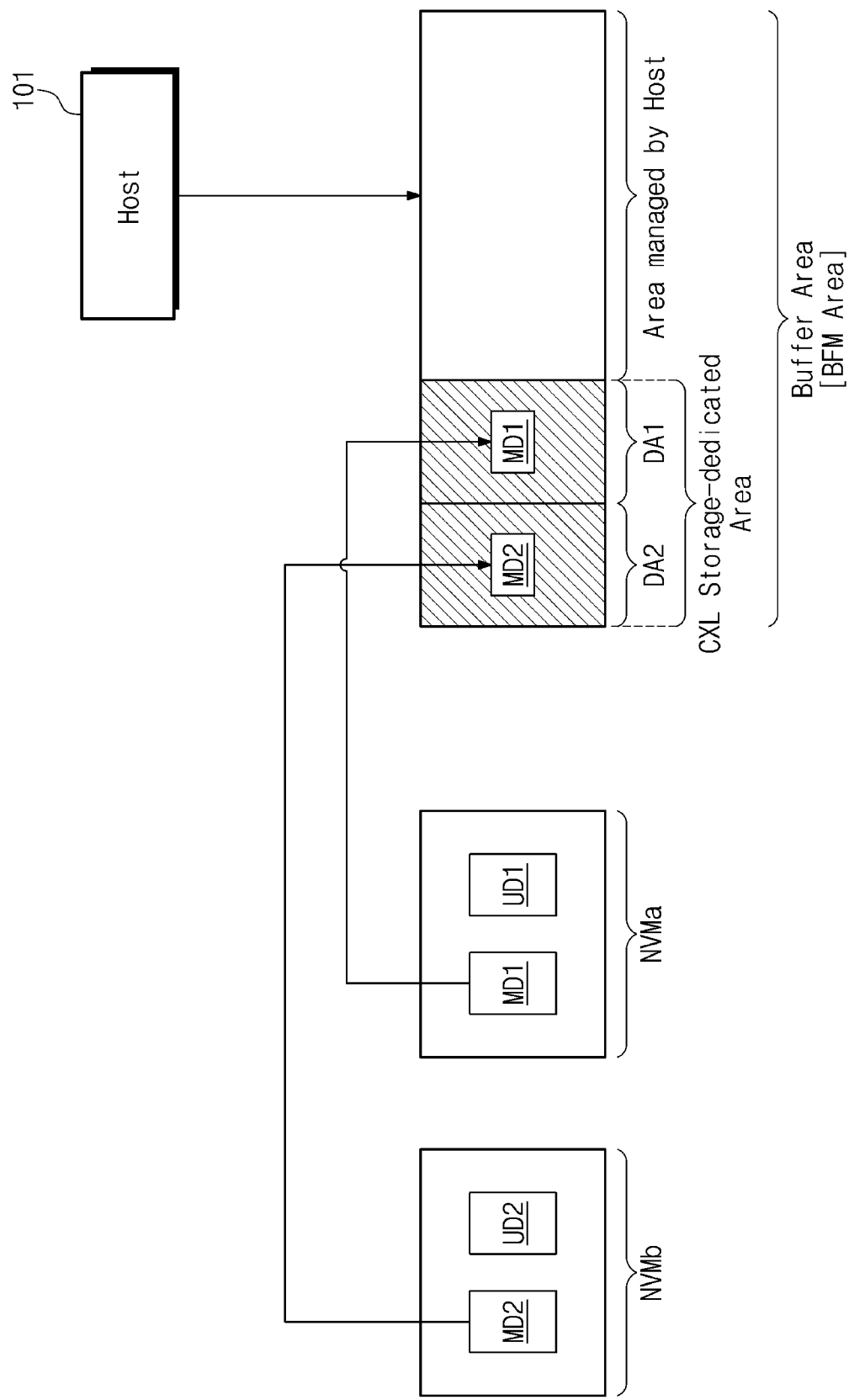
FIG. 5 is a diagram describing an operation in which a computing system of FIG. 4 stores map data.

FIG. 5 is a diagram describing an operation in which a computing system of FIG. 4 stores map data. For convenience of description and for brevity of drawing, components such as the host 101, the first CXL storage 120, the second CXL storage 130, and the CXL memory 110 are conceptually illustrated, and some unnecessary components are omitted.

Referring to FIGS. 3 to 5, a partial area of the CXL memory 110 may be allocated for a dedicated area of the first and second CXL storages 120 and 130. In an embodiment, the dedicated area of the first and second CXL storages 120 and 130 may include a mapping table that includes the first map data MD1 dedicated for the first CXL storage 120 and the second map data MD2 dedicated for the second CXL storage 130.

In detail, the partial area of the CXL memory 110 may include a first dedicated area DA1 allocated to the first CXL storage 120 and a second dedicated area DA2 allocated to the second CXL storage 130. In this case, the first dedicated area DA1 allocated to the first CXL storage 120 may be accessed by the first CXL storage 120 and may be used to store the map data of the first CXL storage 120. The second dedicated area DA2 allocated to the second CXL storage 130 may be accessed by the second CXL storage 130 and may be used to store the map data of the second CXL storage 130.

For example, as illustrated in FIG. 5, the nonvolatile memory NVMa of the first CXL storage 120 may store the first user data UD1 and the first map data MD1. As described above, because the first CXL storage 120 does not include a separate buffer memory, the first CXL storage 120 may require a buffer area in which the first map data MD1 are to be stored. According to an embodiment of the present disclosure, the first map data MD1 of the first CXL storage 120 may be stored in a partial area (e.g., the first dedicated area DA1) of the CXL memory 110. In this case, the first dedicated area DA1 of the CXL memory 110 may be accessed by the first CXL storage 120 through the CXL switch SW_CXL.

Also, the nonvolatile memory NVMb of the second CXL storage 130 may store second user data UD2 and the second map data MD2. As in the first map data MD1, the second map data MD2 of the second CXL storage 130 may be stored in a partial area (e.g., the second dedicated area DA2) of the CXL memory 110. In this case, the second dedicated area DA2 of the CXL memory 110 may be accessed by the second CXL storage 130 through the CXL switch SW_CXL.

In an embodiment, the remaining area of the CXL memory 110, which is not allocated, other than the dedicated area may be an area that is accessible by the host 101 or is managed by the host 101. In this case, the host 101 may access the remaining area of the CXL memory 110 through the CXL switch SW_CXL. In an embodiment, the remaining area of the CXL memory 110, which is not allocated for the dedicated area, may be used as a memory expander.

Figure 6:
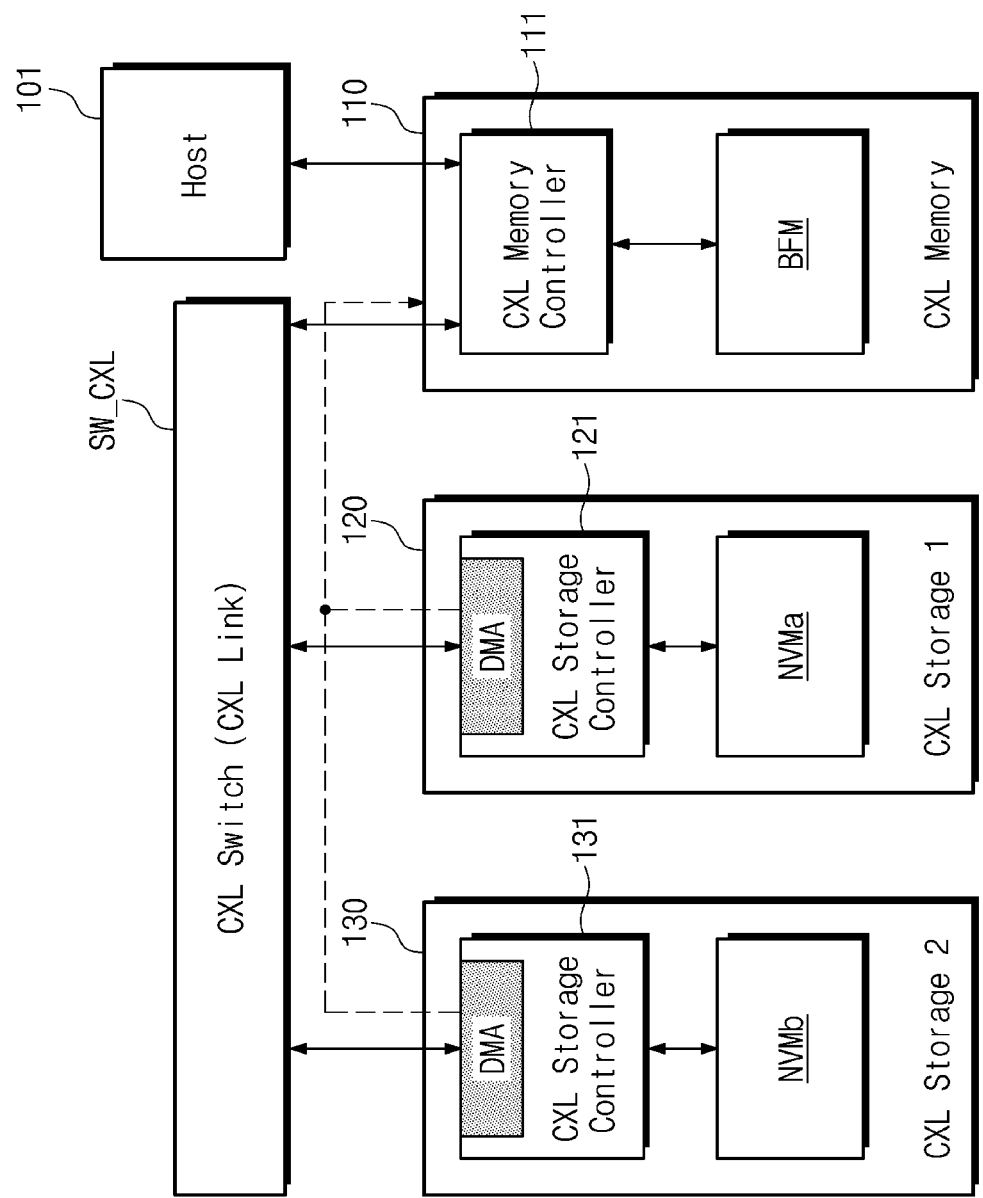
FIG. 6 is a diagram describing an operation in which map data are stored in a CXL memory.

FIG. 6 is a diagram describing an operation in which map data are stored in a CXL memory. In an embodiment, the first map data MD1 present in the first CXL storage 120 and the second map data MD2 present in the second CXL storage 130 may be transferred and stored in the buffer memory BFM of the CXL memory 110 through a peer-to-peer (P2P) manner.

For example, as illustrated in FIG. 6, the first CXL storage controller 121 of the first CXL storage 120 may include a direct memory access (DMA) engine. The DMA engine included in the first CXL storage controller 121 may transfer the first map data MD1 present in the nonvolatile memory NVMa to the CXL memory controller 111 without the interference or control of the host 101. That is, the map data may be transferred from the first CXL storage 120 to the CXL memory 110 based on the P2P manner.

Also, the second CXL storage controller 131 of the second CXL storage 130 may include a DMA engine. The DMA engine included in the second CXL storage controller 131 may transfer the second map data MD2 present in the nonvolatile memory NVMb to the CXL memory controller 111 without the interference or control of the host 101. That is, the map data may be transferred from the second CXL storage 130 to the CXL memory 110 based on the P2P manner.

The above manners in which the map data are transferred from the first CXL storage 120 and the second CXL storage 130 to the CXL memory 110 are provided as an example, and the present disclosure is not limited thereto. It may be understood that the transfer of map data from the first CXL storage 120 and the second CXL storage 130 to the CXL memory 110 is implemented in various manners using the CXL interface or the CXL switch. In an embodiment, the transfer (i.e., the backup or flush) of map data from the CXL memory 110 to the first CXL storage 120 and the second CXL storage 130 may also be implemented in a manner(s) similar to the above manners.

Figure 7:
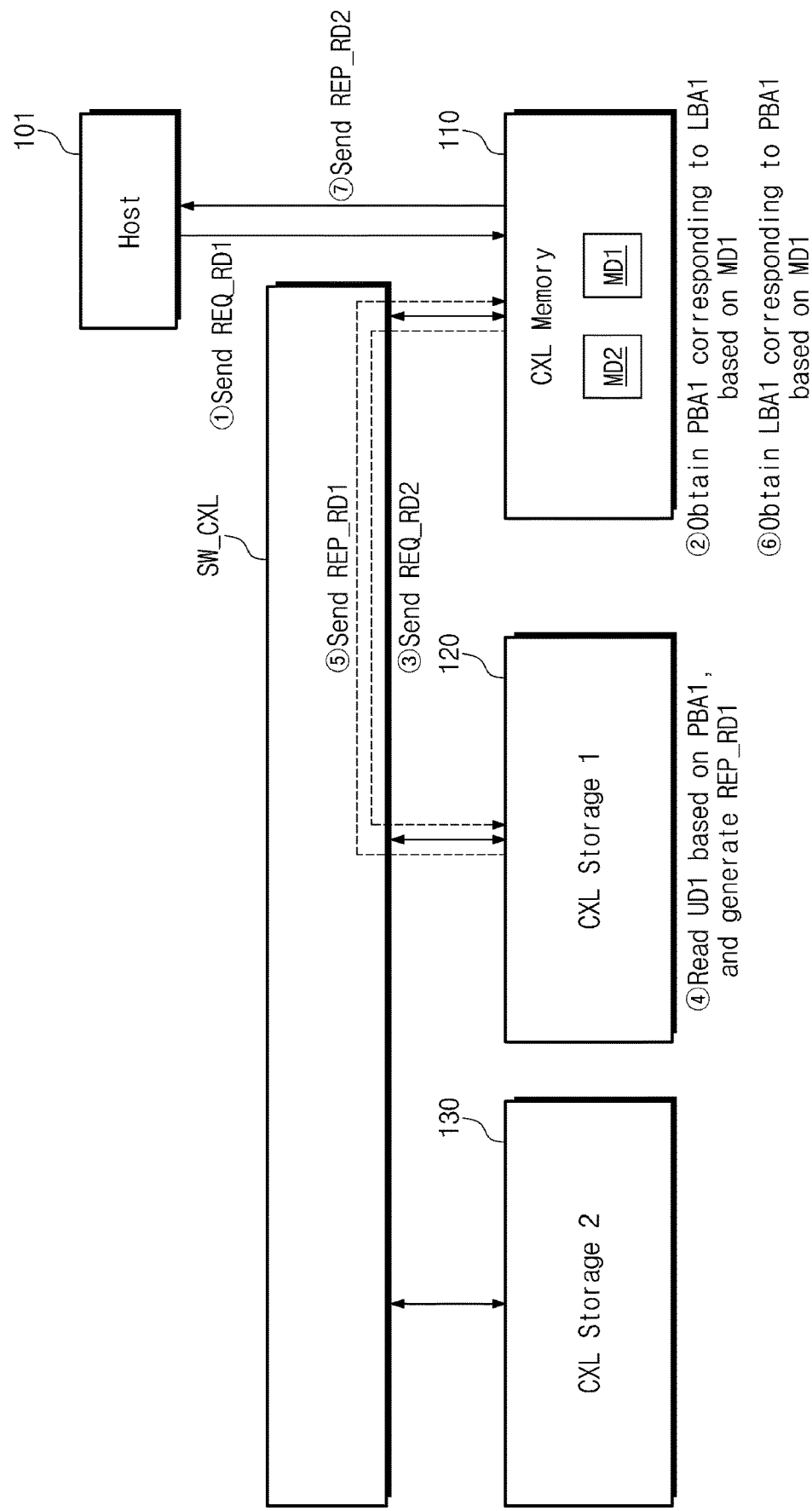
FIG. 7 is a flowchart illustrating a read operation for CXL storage of FIG. 2.

FIG. 7 is a flowchart illustrating a read operation for CXL storage of FIG. 2. In an embodiment, the read operation for the first CXL storage 120 according to the flowchart of FIG. 7 may be performed after the initialization operation of FIG. 4 is performed (i.e., after the first map data MD1 of the first CXL storage 120 are stored in the dedicated area of the CXL memory 110).

Referring to FIGS. 2, 3, and 7, in a first operation ①, the host 101 may send a first read request REQ_RD1 to the CXL memory 110 through the CXL host interface circuit 101a. In an embodiment, the first read request REQ_RD1 may include a command indicating the read operation and a first logical block address LBA1. That is, the first read request REQ_RD1 may refer to a request for reading the first user data UD1 stored in the first CXL storage 120 and may include the first logical block address LBA1 corresponding to the first user data UD1.

In a second operation (②), the CXL memory 110 may obtain a first physical block address PBA1 corresponding to the first logical block address LBA1 included in the first read request REQ_RD1.

For example, the CXL memory controller 111 of the CXL memory 110 may read the first map data MD1 from an area corresponding to a memory address (e.g., a logical address or a virtual address) included in the first read request REQ_RD1. In an embodiment, the CXL memory controller 111 may read the first map data MD1 from the buffer memory BFM by using the buffer memory interface circuit 111*f*. The CXL memory controller 111 may obtain the first physical block address PBA1 corresponding to the first logical block address LBA1 with reference to the first map data MD1.

In a third operation ③, the CXL memory 110 may send a second read request REQ_RD2 to the first CXL storage 120 through the CXL switch SW_CXL. In an embodiment, the second read request REQ_RD2 may include a command indicating the read operation and the first physical block address PBA1.

In a fourth operation ④, the first CXL storage 120 may read the first user data UD1 stored in an area of the nonvolatile memory NVMa, which corresponds to the first physical block address PBA1. For example, the first CXL storage controller 121 may read the first user data UD1 from the area of the nonvolatile memory NVMa, which corresponds to the first physical block address PBA1. In an embodiment, the first CXL storage controller 121 may read the first user data UD1 from the nonvolatile memory NVMa by using the NAND interface circuit 121*d*.

In a fifth operation ⑤, the first CXL storage 120 may send a first read response REP_RD1 to the second read request REQ_RD2 through the CXL storage interface circuit 121*a*. The CXL switch SW_CXL may transfer the first read response REP_RD1 to the CXL memory 110. In an embodiment, the first read response REP_RD1 may include the first user data UD1 requested through the second read request REQ_RD2 and the first physical block address PBA1.

In a sixth operation ⑥, the CXL memory 110 may obtain the first logical block address LBA1 corresponding to the first physical block address PBA1 included in the first read response REP_RD1. For example, the CXL memory controller 111 of the CXL memory 110 may read the first map data MD1 from an area corresponding to a memory address (e.g., a physical address or a virtual address) included in the first read response REP_RD1. In an embodiment, the CXL memory controller 111 may read the first map data MD1 from the buffer memory BFM by using the buffer memory interface circuit 111*f*. The CXL memory controller 111 may obtain the first logical block address LBA1 corresponding to the first physical block address PBA1 with reference to the first map data MD1.

In a seventh operation ⑦, the CXL memory 110 may send a second read response REP_RD2 to the host 101 through the CXL memory interface circuit 111*a*. In an embodiment, the second read response REP_RD2 may include the first user data UD1 and the first logical block address LBA1.

The read operation for the first CXL storage 120 is described with reference to FIG. 7, but the read operation for the second CXL storage 130 may be performed in a manner similar to the above manner.

Figure 8:
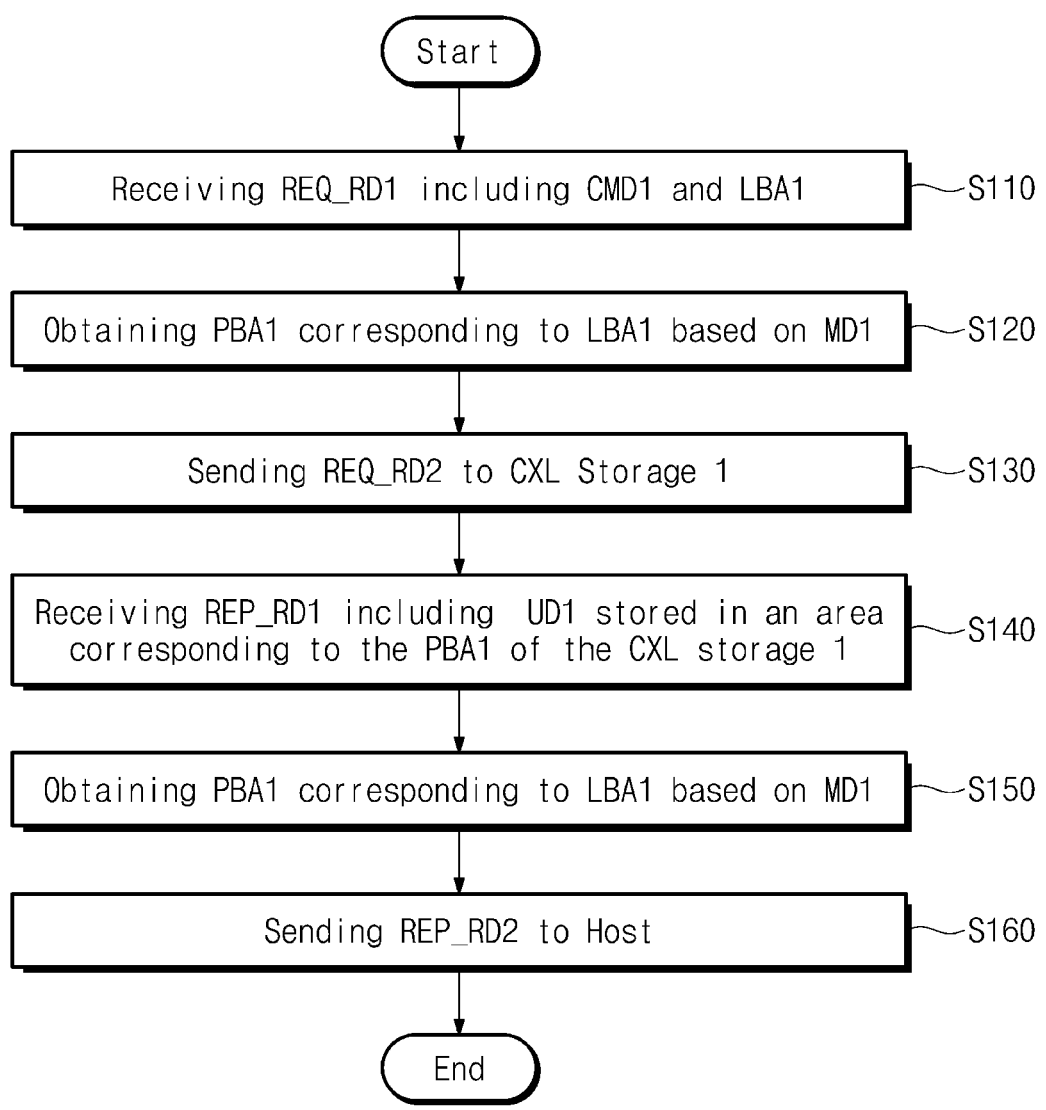
FIG. 8 is a flowchart illustrating a read operation for CXL storage of FIG. 2.

FIG. 8 is a flowchart illustrating a read operation for CXL storage of FIG. 2. An operating method in which the CXL memory 110 performs the read operation for the first CXL storage 120 will be described with reference to FIGS. 2, 3, and 8.

In operation S110, the CXL memory 110 may receive the first read request REQ_RD1 from the host 101 through the CXL memory interface circuit 111*a*. In an embodiment, the first read request REQ_RD1 may include a command indicating the read operation and the first logical block address LBA1.

In operation S120, the CXL memory 110 may obtain the first physical block address PBA1 corresponding to the first logical block address LBA1 included in the first read request REQ_RD1. The CXL memory controller 111 of the CXL memory 110 may obtain the first physical block address PBA1 corresponding to the first logical block address LBA1 with reference to the first map data MD1.

In operation S130, the CXL memory 110 may send the second read request REQ_RD2 to the first CXL storage 120 through the CXL switch SW_CXL. In an embodiment, the second read request REQ_RD2 may include a command indicating the read operation and the first physical block address PBA1.

In operation S140, the CXL memory 110 may receive the first read response REP_RD1 from the first CXL storage 120. In an embodiment, the first read response REP_RD1 may include the first user data UD1 requested through the second read request REQ_RD2 and the first physical block address PBA1.

In operation S150, the CXL memory 110 may obtain the first logical block address LBA1 corresponding to the first physical block address PBA1 included in the first read response REP_RD1. The CXL memory controller 111 of the CXL memory 110 may obtain the first logical block address LBA1 corresponding to the first physical block address PBA1 with reference to the first map data MD1.

In operation S160, the CXL memory 110 may send the second read response REP_RD2 to the host 101 through the CXL memory interface circuit 111*a*. In an embodiment, the second read response REP_RD2 may include the first user data UD1 and the first logical block address LBA1.

Figure 9:
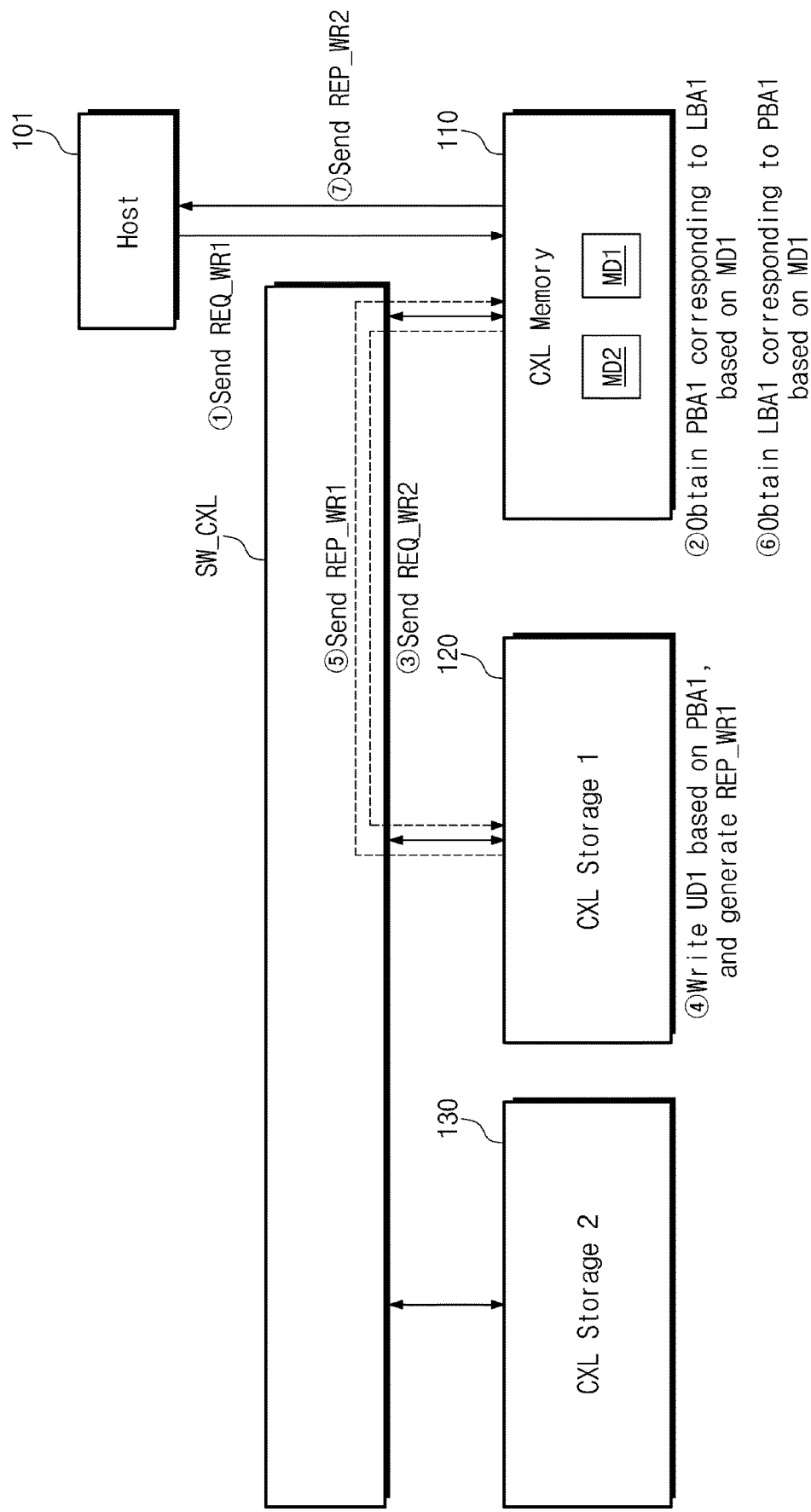
FIG. 9 is a flowchart illustrating a write operation for CXL storage of FIG. 2.

FIG. 9 is a flowchart illustrating a write operation for CXL storage of FIG. 2. In an embodiment, the write operation for the first CXL storage 120 according to the flowchart of FIG. 9 may be performed after the initialization operation of FIG. 4 is performed (i.e., after the first map data MD1 of the first CXL storage 120 are stored in the dedicated area of the CXL memory 110).

Referring to FIGS. 2, 3, and 9, in a first operation ①, the host 101 may send a first write request REQ_WR1 to the CXL memory 110 through the CXL host interface circuit 101*a*. In an embodiment, the first write request REQ_WR1 may include a command indicating the write operation, the first logical block address LBA1 and the first user data UD1. That is, the first write request REQ_WR1 may refer to a request for writing the first user data UD1 in a CXL storage and may include the first logical block address LBA1 corresponding to the first user data UD1. All or part of the first user data UD1 may be temporarily stored in the buffer memory BFM of the CXL memory 110.

In a second operation ②, the CXL memory 110 may obtain the first physical block address PBA1 corresponding to the first logical block address LBA1 included in the first write request REQ_WR1. In detail, the CXL memory 110 may determine CXL storage in which the first user data UD1 are to be written, in response to the first write request REQ_WR1. For example, the CXL memory 110 may select CXL storage in which the first user data UD1 are to be written, in consideration of the capacity of each of the first CXL storage 120 and the second CXL storage 130.

Also, the FTL 111*d* of the CXL memory 110 may manage block information about a memory block, which is free, capable of being written, or capable of being allocated, from among memory blocks included in a nonvolatile memory of the selected CXL storage. The FTL 111*d* may select a memory block of the CXL storage, in which the first user data UD1 are to be written, based on the block information. That is, the first physical block address PBA1 may refer to a physical address of a memory block of the CXL storage selected by the CXL memory 110 to write the first user data UD1.

When the address of the selected memory block indicates a memory block included in the first CXL storage 120, in a third operation ③, the CXL memory 110 may send a second write request REQ_WR2 to the first CXL storage 120 through the CXL switch SW_CXL. In an embodiment, the second write request REQ_WR2 may include a command indicating the write operation, the first physical block address PBA1 and the first user data UD1.

In a fourth operation ④, the first CXL storage 120 may write the first user data UD1 in the selected memory block. For example, the first CXL storage controller 121 may control the nonvolatile memory NVMa such that the first user data UD1 are written in the selected memory block. In an embodiment, the first CXL storage controller 121 may write the first user data UD1 in the nonvolatile memory NVMa by using the NAND interface circuit 121d.

When the first user data UD1 are completely written in the nonvolatile memory NVMa (i.e., when a program operation for the nonvolatile memory NVMa is passed), the first CXL storage 120 may generate write map data. For example, the write map data may include information indicating that the first user data UD1 corresponding to the first logical block address LBA1 are stored in the first CXL storage 120 as a result of the selection in the second operation ②.

In a fifth operation ⑤, the first CXL storage 120 may send a first write response REP_WR1 to the second write request REQ_WR2 through the CXL storage interface circuit 121a. The CXL switch SW_CXL may transfer the first write response REP_WR1 to the CXL memory 110. In an embodiment, the first write response REP_WR1 may include the write map data and the first physical block address PBA1.

In a sixth operation ⑥, the CXL memory 110 may obtain the first logical block address LBA1 corresponding to the first physical block address PBA1 included in the first write response REP_WR1. In an embodiment, the CXL memory 110 may update the first map data MD1 based on the write map data. For example, the first map data MD1 may further include an attribute indicating the CXL storage in which the first user data UD1 is written, and the CXL memory 110 may update the attributes corresponding to the first logical block address LBA1 and the first physical block address PBA1 such that the attribute indicates the first CXL storage 120, based on the write map data. The CXL memory 110 may obtain the first logical block address corresponding to the first physical block address PBA1 based on the updated first map data MD1.

In a seventh operation ⑦, the CXL memory 110 may send a second write response REP_WR2 to the host 101 through the CXL memory interface circuit 111a. In an embodiment, the second write response REP_WR2 may include the updated first logical block address. In response to the second write response REP_WR2, the host 101 may determine that the first user data UD1 corresponding to the first write request REQ_WR1 are normally stored.

The write operation for the first CXL storage 120 is described with reference to FIG. 9, but the write operation for the second CXL storage 130 may also be performed in a manner similar to the above manner.

Figure 10:
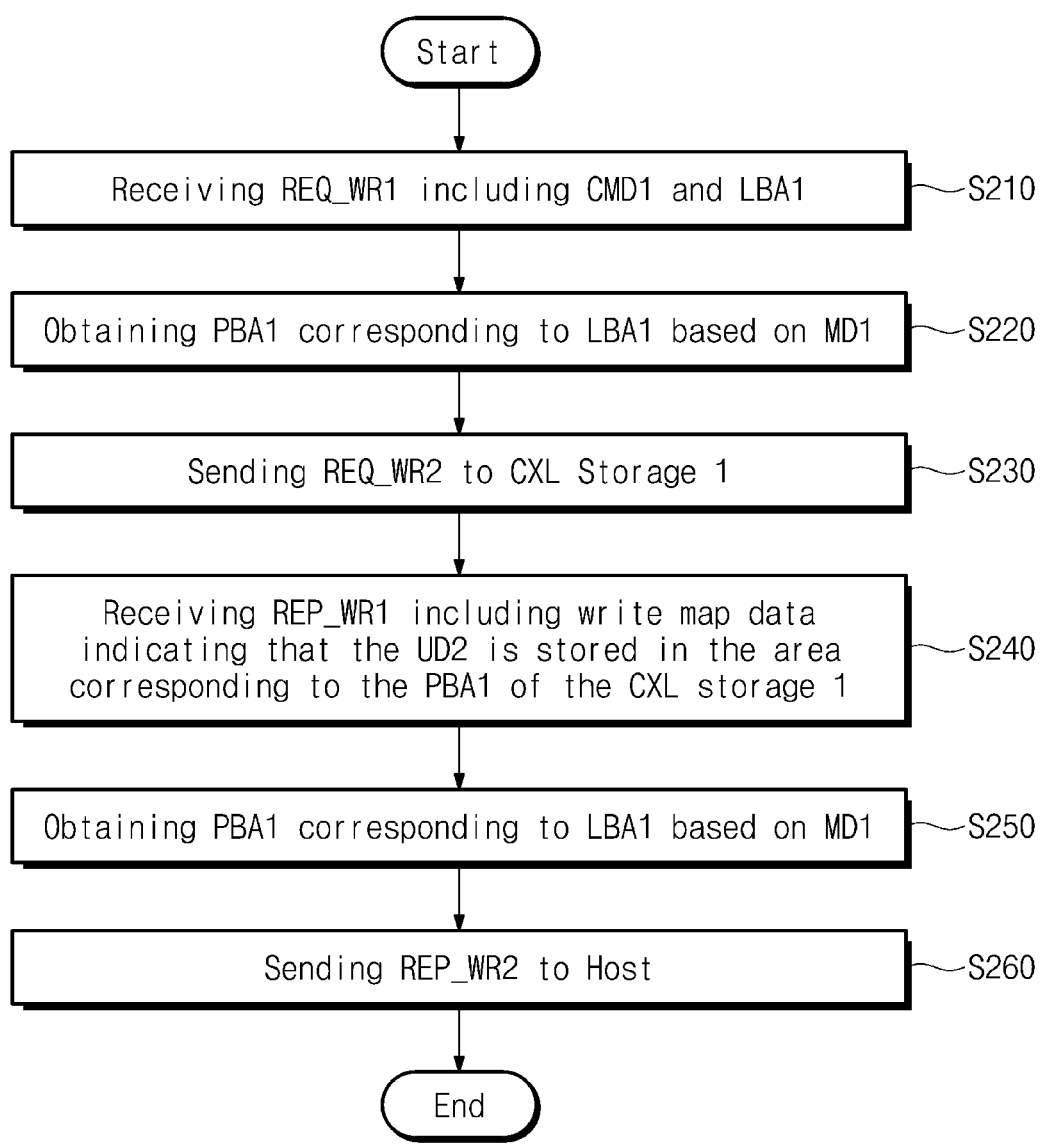
FIG. 10 is a flowchart illustrating a write operation for CXL storage of FIG. 2.

FIG. 10 is a flowchart illustrating a write operation for CXL storage of FIG. 2. An operating method in which the CXL memory 110 performs the write operation for the first CXL storage 120 will be described with reference to FIGS. 2, 3, and 10.

In operation S210, the CXL memory 110 may receive the first write request REQ_WR1 from the host 101 through the CXL memory interface circuit 111a. In an embodiment, the first write request REQ_WR1 may include a command indicating the write operation and the first logical block address LBA1.

In operation S220, the CXL memory 110 may obtain the first physical block address PBA1 corresponding to the first logical block address LBA1 included in the first write request REQ_WR1. The CXL memory controller 111 of the CXL memory 110 may determine CXL storage where the first user data UD1 are to be written, in response to the first write request REQ_WR1.

In operation S230, the CXL memory 110 may send the second write request REQ_WR2 to the first CXL storage 120 through the CXL switch SW_CXL. In an embodiment, the second write request REQ_WR2 may include a command indicating the write operation and the first physical block address PBA1.

In operation S240, the CXL memory 110 may receive the first write response REP_WR1 from the first CXL storage 120. In an embodiment, the first write response REP_WR1 may include write map data and the first physical block address PBA1.

In operation S250, the CXL memory 110 may obtain the first logical block address LBA1 corresponding to the first physical block address PBA1 included in the first write response REP_WR1. In an embodiment, the CXL memory 110 may update the first map data MD1 based on the write map data.

In operation S260, the CXL memory 110 may send the second write response REP_WR2 to the host 101 through the CXL memory interface circuit 111a. In an embodiment, the second write response REP_WR2 may include the updated first logical block address LBA1.

Figure 11:
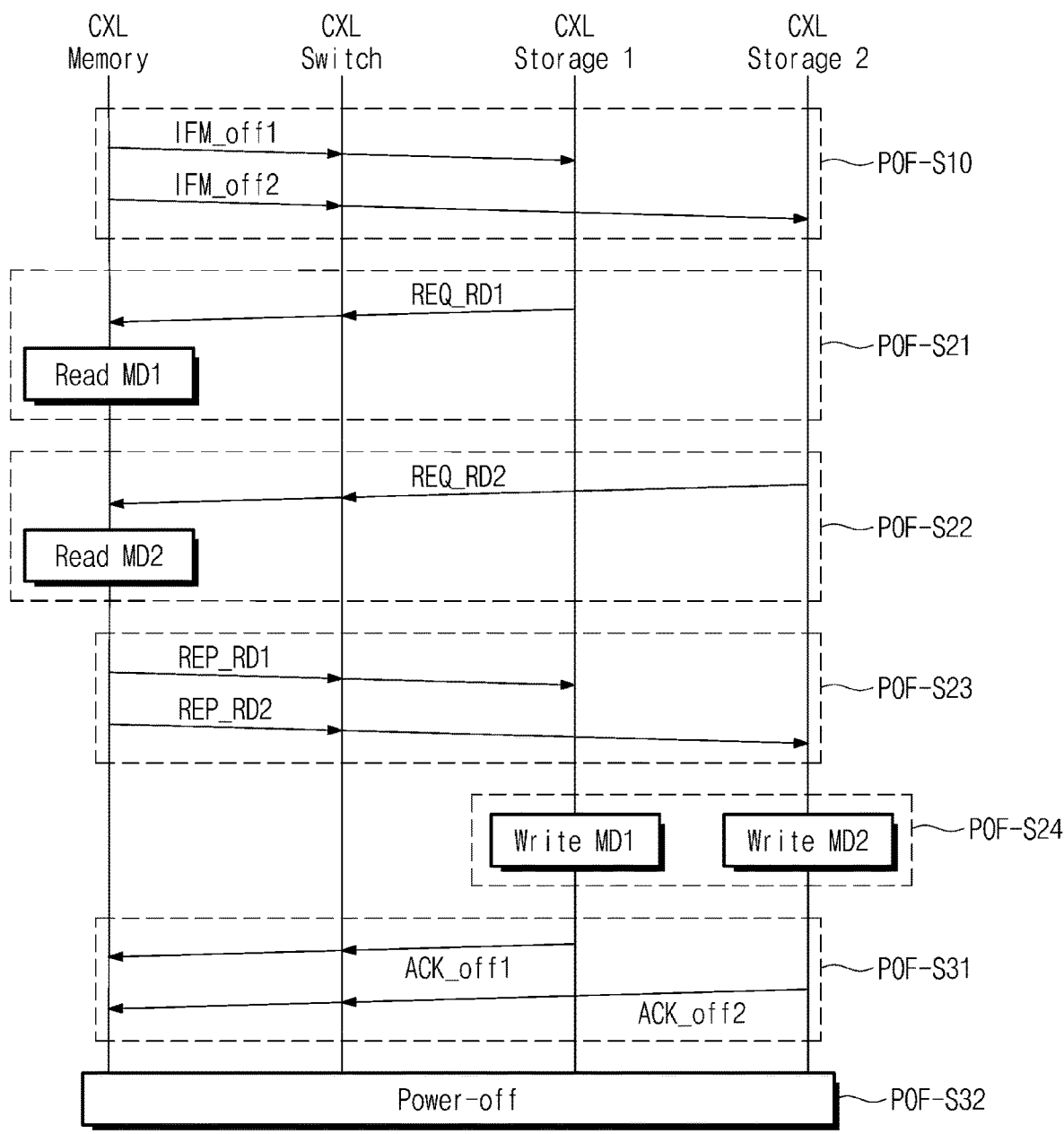
FIG. 11 is a flowchart illustrating a power-off operation of a computing system of FIG. 2.

FIG. 11 is a flowchart describing a power-off operation of a computing system of FIG. 2. FIG. 11 is a flowchart illustrating a power-off operation of a computing system of FIG. 2. In an embodiment, a power-off operation of a computing system will be described with reference to FIG. 11, but the present disclosure is not limited thereto. For example, it may be understood that the operating method of FIG. 11 is applicable to the power-off operation or reset operation of each of various components (e.g., a host, CXL storage, a CXL memory, and a CXL switch) included in the computing system.

Referring to FIGS. 2 and 11, in operation POF-S10, the CXL memory 110 may output first power-off information IFM_off1 and second power-off information IFM_off2 to the CXL switch SW_CXL through the CXL memory interface circuit 111a. The CXL switch SW_CXL may transfer the power-off information IFM_off to the first CXL storage 120.

That is, the CXL memory 110 may send the first power-off information IFM_off1, which allows the first CXL storage 120 to perform the power-off operation, to the first CXL storage 120 through the CXL switch SW_CXL. The CXL memory 110 may send the second power-off information IFM_off2, which allows the second CXL storage 130 to perform the power-off operation, to the second CXL storage 130 through the CXL switch SW_CXL.

In operation POF-S21, the first CXL storage 120 may output the first read request REQ_RD1 through the CXL storage interface circuit 121a in response to the first power-off information IFM_off1. The CXL switch SW_CXL may transfer the first read request REQ_RD1 to the CXL memory 110. In an embodiment, the first read request REQ_RD1 in operation POF-S21 may refer to a request for reading the first map data MD1 stored in the CXL memory 110. The first read request REQ_RD1 may include a memory address of an area where the first map data MD1 are stored.

The CXL memory 110 may read the first map data MD1 in response to the first read request REQ_RD1. For example, the CXL memory 110 may read the first map data MD1 from the buffer memory BFM based on the memory address included in the first read request REQ_RD1.

In operation POF-S22, the second CXL storage 130 may output the second read request REQ_RD2 through the CXL storage interface circuit 131a in response to the second power-off information IFM_off2. The CXL switch SW_CXL may transfer the second read request REQ_RD2 to the CXL memory 110. In an embodiment, the second read request REQ_RD2 in operation POF-S22 may refer to a request for reading the second map data MD2 stored in the CXL memory 110. The second read request REQ_RD2 may include a memory address of an area where the second map data MD2 are stored.

The CXL memory 110 may read the second map data MD2 in response to the second read request REQ_RD2. For example, the CXL memory 110 may read the second map data MD2 from the buffer memory BFM based on the memory address included in the second read request REQ_RD2. Also, for convenience of illustration, an example where operation POF-S22 is performed after operation POF-S21 is illustrated, but the present disclosure is not limited thereto. For example, operation POF-S21 may be performed after operation POF-S22, or operation POF-S21 and operation PUP-S22 may be simultaneously performed.

In operation POF-S23, the CXL memory 110 may output the first read response REP_RD1 to the first read request REQ_RD1 through the CXL memory interface circuit 111a. The CXL switch SW_CXL may transfer the first read response REP_RD1 to the first CXL storage 120. The CXL memory 110 may output the second read response REP_RD2 to the second read request REQ_RD2 through the CXL memory interface circuit 111a. The CXL switch SW_CXL may transfer the second read response REP_RD2 to the second CXL storage 130.

In operation POF-S24, the first CXL storage 120 may write the first map data MD1 included in the first read response REP_RD1 in the nonvolatile memory NVMa. In an embodiment, the first CXL storage 120 may store the first map data MD1 in a given area of the nonvolatile memory NVMa. The second CXL storage 130 may write the second map data MD2 included in the second read response REP_RD2 in the nonvolatile memory NVMb. In an embodiment, the second CXL storage 130 may store the second map data MD2 in a given area of the nonvolatile memory NVMb.

After the first map data MD1 associated with the first CXL storage 120 are stored in the nonvolatile memory NVMa and the second map data MD2 associated with the second CXL storage 130 are stored in the nonvolatile memory NVMb, in operation POF-S31, the first CXL storage 120 may output a first response ACK_off1 to the first power-off information IFM_off1. The CXL switch SW_CXL may send the first response ACK_off1 to the CXL memory 110. The CXL memory 110 may recognize that the first map data MD1 present in the CXL memory 110 are normally stored in the first CXL storage 120, based on the first response ACK_off1.

The second CXL storage 130 may output a second response ACK_off2 to the second power-off information IFM_off2. The CXL switch SW_CXL may send the second response ACK_off2 to the CXL memory 110. The CXL memory 110 may recognize that the second map data MD2 present in the CXL memory 110 are normally stored in the second CXL storage 130, based on the second response ACK_off2.

Afterwards, in operation POF-S32, the first CXL storage 120, the second CXL storage 130, the CXL memory 110, and the CXL switch SW_CXL may be powered off. For example, the CXL memory 110 may send a power interruption request to the host 101; based on the power interruption request, the host 101 may interrupt the power that is supplied to the first CXL storage 120, the second CXL storage 130, the CXL memory 110, and the CXL switch SW_CXL.

For convenience of illustration, an example where the operation for the first CXL storage 120 is performed prior to the operation for the second CXL storage 130 is illustrated, but the present disclosure is not limited thereto. For example, the operation for the first CXL storage 120 may be performed after the operation for the second CXL storage 130, or the operation for the first CXL storage 120 and the operation for the second CXL storage 130 may be simultaneously performed.

The power-off operation described with reference to FIG. 11 is provided as an example, and the present disclosure is not limited thereto. For example, in the embodiment of FIG. 11, after the first CXL storage 120 stores the first map data MD1 present in the CXL memory 110 in the nonvolatile memory NVMa, the CXL memory 110 may provide notification that the first map data MD1 and the second map data MD2 are completely backed up, by sending the first response ACK_off1 and the second response ACK_off2 to the host 11 (i.e., an interrupt manner). Alternatively, the first CXL storage 120 may store the first map data MD1 present in the CXL memory 110 in the nonvolatile memory NVMa and may then set a value of a specific register to a given value. The host 101 may determine whether the first map data MD1 are completely backed up, by periodically checking the value of the specific register through the CXL memory 110 (i.e., a polling manner). Alternatively, the first CXL storage 120 may be configured to complete the backup operation for the first map data MD1 within a given time from a point in time when the first power-off information IFM_off1 is received from the CXL memory 110 (i.e., a time-out manner). As described above, the first CXL storage 120 may transfer information, which indicates that the first map data MD1 are completely backed up, to the host 101 through the CXL memory 110 by using at least one of the above manners.

Figure 12:
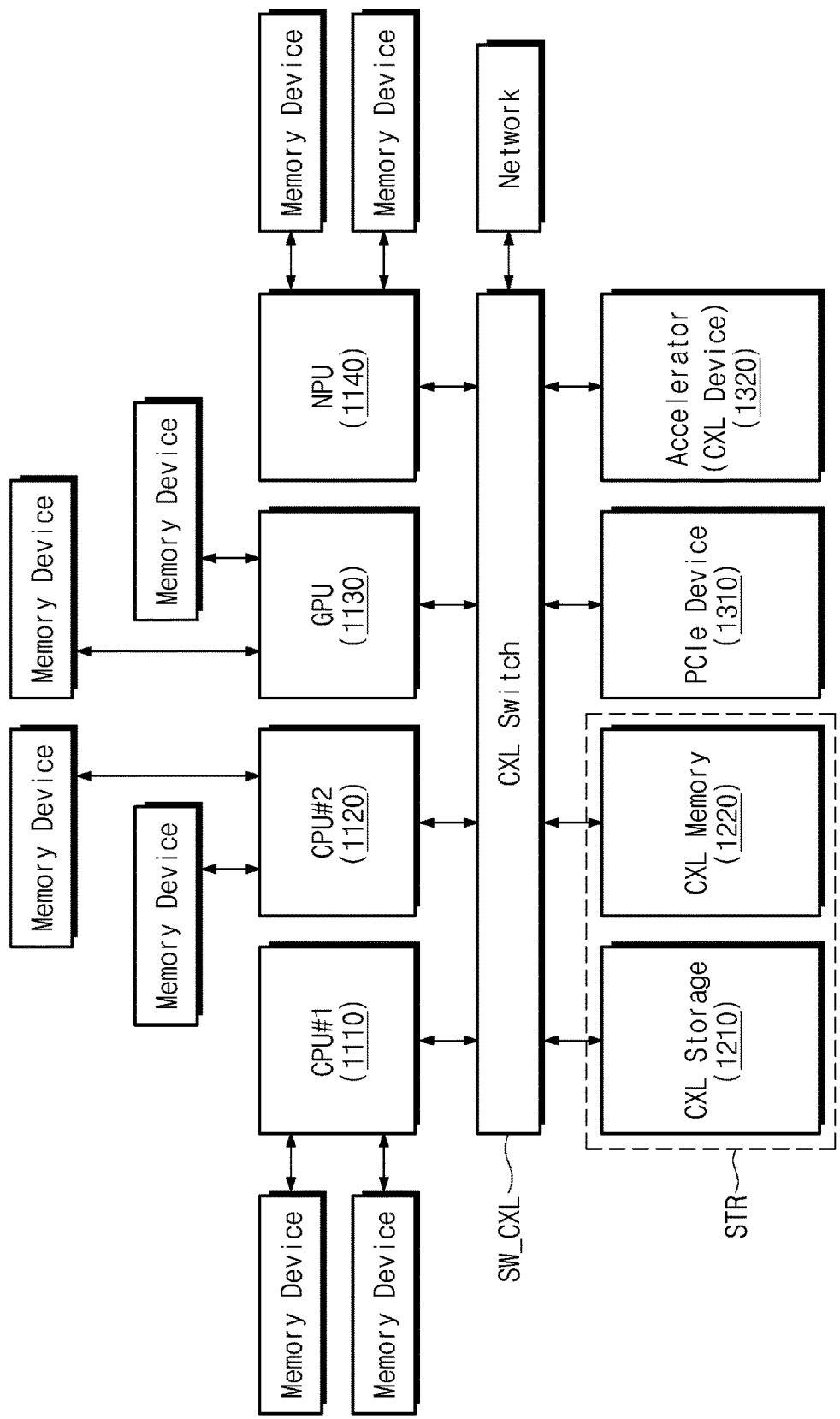
FIG. 12 is a block diagram of a computing system according to an embodiment of the present disclosure.

FIG. 12 is a block diagram illustrating a computing system according to an embodiment of the present disclosure. For convenience of description, additional description associated with the components described above will be omitted to avoid redundancy. Referring to FIG. 12, a computing system 1000 may include a first CPU 1110, a second CPU 1120, a GPU 1130, an NPU 1140, the CXL switch SW_CXL, CXL storage 1210, a CXL memory 1220, a PCIe device 1310, and an accelerator (CXL device) 1320.

The first CPU 1110, the second CPU 1120, the GPU 1130, the NPU 1140, the CXL storage 1210, the CXL memory 1220, the PCIe device 1310, and the accelerator (CXL device) 1320 may be connected in common with the CXL switch SW_CXL and may communicate with each other through the CXL switch SW_CXL.

In an embodiment, each of the first CPU 1110, the second CPU 1120, the GPU 1130, and the NPU 1140 may be the host described with reference to FIGS. 1 to 12 and may be directly connected with individual memory devices.

In an embodiment, the CXL storage 1210 and the CXL memory 1220 may be the CXL storage and the CXL memory described with reference to FIGS. 2 to 12, and at least a partial area of the CXL memory 1220 may be allocated for an area dedicated for the CXL storage 1210 by one or more of the first CPU 1110, the second CPU 1120, the GPU 1130, and the NPU 1140. That is, the CXL storage 1210 and the CXL memory 1220 may be used as a storage space STR of the computing system 1000.

In an embodiment, the CXL switch SW_CXL may be connected with the PCIe device 1310 or the accelerator 1320 configured to support various functions, and the PCIe device 1310 or the accelerator 1320 may communicate with each of the first CPU 1110, the second CPU 1120, the GPU 1130, and the NPU 1140 through the CXL switch SW_CXL or may access the storage space STR including the CXL storage 1210 and the CXL memory 1220 through the CXL switch SW_CXL.

In an embodiment, the CXL switch SW_CXL may be connected with an external network or Fabric and may be configured to communicate with an external server through the external network or Fabric.

Figure 13:
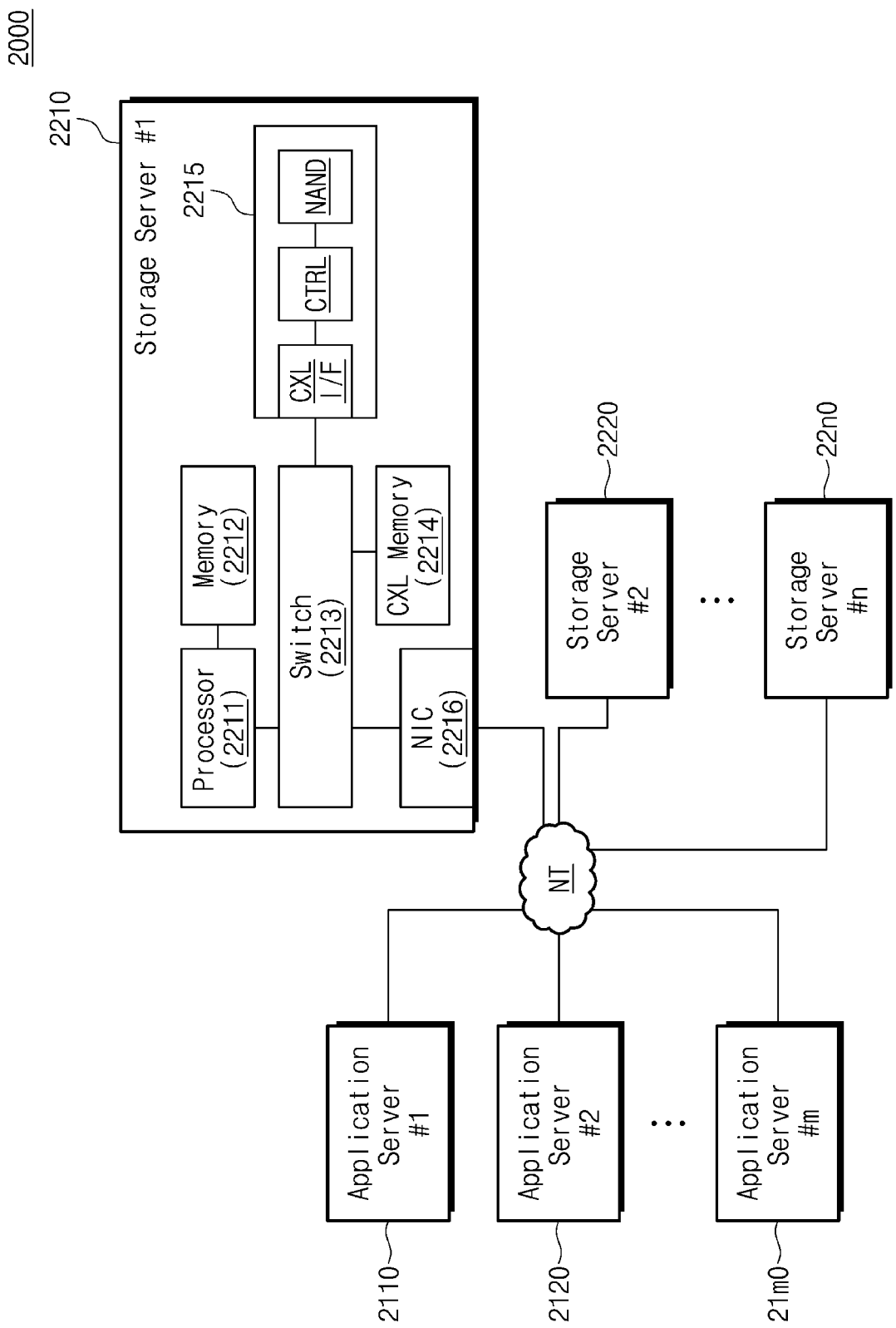
FIG. 13 is a block diagram of a computing system according to an embodiment of the present disclosure.

FIG. 13 is a block diagram illustrating a data center to which a computing system according to an embodiment of the present disclosure is applied. Referring to FIG. 13, a data center 2000 that is a facility collecting various data and sending services may be referred to as a "data storage center". The data center 2000 may be a system for operating a search engine and a database, and may be a computing system used in a business such as a bank or in a government institution. The data center 2000 may include application servers 2110 to 21m0 and storage servers 2210 to 22n0. The number of application servers and the number of storage servers may be variously selected depending on an embodiment, and the number of application servers and the number of storage servers may be different from each other.

Below, a configuration of the first storage server 2210 will be mainly described. The application servers 2110 to 21m0 may have similar structures, the storage servers 2210 to 22n0 may have similar structures, and the application servers 2110 to 21m0 and the storage servers 2210 to 22n0 may communicate with each other over a network NT.

The first storage server 2210 may include a processor 2211, a memory 2212, a switch 2213, a storage device 2215, a CXL memory 2214, and a network interface card (NIC) 2216. The processor 2211 may control an overall operation of the first storage server 2210 and may access the memory 2212 to execute an instruction loaded onto the memory 2212 or to process data. The memory 2212 may be implemented with a DDR SDRAM (Double Data Rate Synchronous DRAM), an HBM (High Bandwidth Memory), an HMC (Hybrid Memory Cube), a DIMM (Dual In-line Memory Module), an Optane DIMM, and/or an NVMDIMM (Non-Volatile DIMM). The processor 2211 and the memory 2212 may be directly connected, and the numbers of processors and memories included in one storage server 2210 may be variously selected.

In an embodiment, the processor 2211 and the memory 2212 may form a processor-memory pair. In an embodiment, the number of processors 2211 and the number of memories 2212 may be different from each other. The processor 2211 may include a single core processor or a multi-core processor. The detailed description of the storage server 2210 may be similarly applied to the application servers 2110 to 21m0.

The switch 2213 may be configured to arbitrate or route the communications between various components included in the first storage server 2210. In an embodiment, the switch 2213 may be implemented with the CXL switch SW_CXL described with reference to FIGS. 1 to 12. That is, the switch 2213 may be a switch implemented based on the CXL protocol.

The CXL memory 2214 may be connected with the switch 2213. In an embodiment, the CXL memory 2214 may be used as a memory expander for the processor 2211. Alternatively, as described with reference to FIGS. 1 to 12, the CXL memory 2214 may be allocated for a dedicated memory or a buffer memory of the storage device 2215.

The storage device 2215 may include a CXL interface circuit CXL_IF, a controller CTRL, and a NAND flash NAND. Depending on a request of the processor 2211, the storage device 2215 may store data or may output the stored data. In an embodiment, the storage device 2215 may be implemented with the first CXL storage described with reference to FIGS. 1 to 12. In an embodiment, as in the description given with reference to FIGS. 1 to 12, at least a partial area of the CXL memory 2214 may be allocated for a dedicated area, and the dedicated area may be used as a buffer memory (i.e., may be used to store map data in the CXL memory 2214).

In an embodiment, the first storage server 2210 may include a plurality of storage devices. In this case, at least a partial area of the CXL memory 2214 may be allocated for a dedicated area of each of the plurality of storage devices, and the dedicated area of each of the plurality of storage devices may be used as a buffer memory of each of the plurality of storage devices.

According to an embodiment, the application servers 2110 to 21m0 may not include the storage device 2215. The storage server 2210 may include at least one or more storage devices 2215. The number of storage devices 2215 included in the storage server 2210 may be variously selected depending on an embodiment.

The NIC 2216 may be connected with the CXL switch SW_CXL. The NIC 2216 may communicate with the remaining storage servers 2220 to 22n0 or the application servers 2210 to 21m0 over the network NT.

In an embodiment, the NIC 2216 may include a network interface card, a network adapter, etc. The NIC 2216 may be connected with the network NT by a wired interface, a wireless interface, a Bluetooth interface, an optical interface, etc. The NIC 2216 may include an internal memory, a digital signal processor (DSP), a host bus interface, etc. and may be connected with the processor 2211 and/or the switch 2213 through the host bus interface. In an embodiment, the NIC 2216 may be integrated with at least one of the processor 2211, the switch 2213, and the storage device 2215.

In an embodiment, the network NT may be implemented by using a Fibre channel (FC) or an Ethernet. In this case, the FC may be a medium that is used in high-speed data transmission and may use an optical switch that sending high performance/high availability. Storage servers may be provided as file storage, block storage, or object storage depending on an access manner of the network NT.

In an embodiment, the network NT may be a storage-dedicated network such as a storage area network (SAN). For example, the SAN may be a FC-SAN that uses a FC network and is implemented depending on a FC protocol (FCP). For another example, the SAN may be an IP-SAN that uses a TCP/IP network and is implemented depending on an iSCSI (SCSI over TCP/IP or Internet SCSI). In an embodiment, the network NT may be a legacy network such as a TCP/IP network. For example, the network NT may be implemented depending on the following protocol: FCoE (FC over Ethernet), NAS (Network Attached Storage), or NVMe-oF (NVMe over Fabrics).

In an embodiment, at least one of the application servers 2110 to 21*m*0 may store data, which are store-requested by a user or a client, in one of the storage servers 2210 to 22*n*0 over the network NT. At least one of the application servers 2110 to 21*m*0 may obtain data, which are read-requested by the user or the client, from one of the storage servers 2210 to 22*n*0 over the network NT. For example, at least one of the application servers 2110 to 21*m*0 may be implemented with a web server, a database management system (DBMS), etc.

In an embodiment, at least one of the application servers 2110 to 21*m*0 may access a memory, a CXL memory, or a storage device included in any other application server over the network NT or may access memories, CXL memories, or storage devices included in the storage servers 2210 to 22*n*0 over the network NT. As such, at least one of the application servers 2110 to 21*m*0 may perform various operations on data stored in the remaining application servers and/or storage servers. For example, at least one of the application servers 2110 to 21*m*0 may execute an instruction for moving or copying data between the remaining application servers and/or storage servers. In this case, the data may be moved from storage devices of storage servers to memories or CXL memories of application servers through memories or CXL memories of the storage servers or directly. The data that are transferred over a network may be data that are encrypted for security or privacy.

In an embodiment, a CXL memory included in at least one of the application servers 2110 to 21*m*0 and the storage servers 2210 to 22*n*0 may be allocated for a dedicated area of a storage device included in at least one of the application servers 2110 to 21*m*0 and the storage servers 2210 to 22*n*0, and the storage device may use the dedicated area thus allocated as a buffer memory (i.e., may store map data in the dedicated area). For example, a CXL memory included in a storage server (e.g., 22*n*0) may be allocated to the storage device 2215 included in the storage server 2210, and the storage device 2215 included in the storage server 2210 may access the CXL memory included in the storage server (e.g., 22*n*0) over the switch 2213 and the NIC 2216. In this case, the map data associated with the storage device 2215 of the first storage server 2210 may be stored in the CXL memory of the storage server 22*n*0. That is, storage devices and CXL memories of a data center according to the present disclosure may be connected and implemented in various manners.

According to an embodiment of the present disclosure, a memory device managing map data of each of a plurality of storage devices and an operating method thereof are provided.

According to an embodiment of the present disclosure, as the plurality of storage devices are connected with a memory device in a cascade structure without the connection with a host, storage devices, the number of which is more than the number of storage devices capable of being connected with an existing host, may be connected. Accordingly, a high-capacity computing system may be implemented.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. An operating method of a memory device, the operating method comprising:

receiving first map data from a first storage device, the first map data being dedicated for the first storage device;

receiving second map data from a second storage device, the second map data being dedicated for the second storage device;

storing the first map data and the second map data in a map table;

receiving, from a host device through a first interface, a first request comprising a command and a first logical block address;

obtaining, based on the first logical block address, a first physical block address with reference to the first map data for managing data stored in the first storage device; and sending, to the first storage device through a second interface, a second request comprising the first physical block address and the command, the second interface being different from the first interface, wherein the host device comprises a compute express link (CXL) host interface circuit, wherein the first storage device comprises a first CXL storage interface circuit, a first NAND interface circuit, a first non-volatile memory (NVM), first map data, and first user data, wherein the second storage device comprises a second CXL storage interface circuit, a second NAND interface circuit, a second NVM, second map data, and second user data, wherein the memory device comprises: a CXL memory interface circuit, a memory manager, a buffer memory interface circuit, and a buffer memory, wherein the first interface is configured to communicate with the host device via the CXL host interface circuit and the memory device via the CXL memory interface circuit, and wherein the second interface is configured to communicate with the first storage device via the first CXL storage interface circuit using CXL.mem characterized by a memory coherency, the second storage device via the second CXL storage interface circuit using CXL.mem characterized by the memory coherency, and the memory device via the CXL memory interface circuit, wherein the second interface is a CXL interface, and the first interface and the second interface are implemented by a CXL switch.

2. The operating method of claim 1, wherein the sending the second request comprises sending the second request for memory allocation to the first storage device through the second interface using the P2P communication based on a CXL protocol.

3. The operating method of claim 1, wherein the sending the second request comprises sending the second request, to the first storage device through the second interface, by using CXL.mem protocol, based on the CXL interface.

4. The operating method of claim 1, further comprising:

receiving, from the host device through the first interface, a third request comprising the command and a second logical block address;

obtaining, based on the second logical block address, a second physical block address with reference to the second map data for managing data stored in the second storage device; and sending, to the second storage device through the second interface, a fourth request comprising the second physical block address and the command.

5. The operating method of claim 4, wherein a remaining capacity of the memory device, other than a capacity for storing the first map data and the second map data, is used as a memory dedicated for the host device.

6. The operating method of claim 1, further comprising receiving, from the first storage device through the second interface, a first read response comprising the first user data stored in an area of the first storage device, which corresponds to the first physical block address, based on sending the second request to the first storage device,
wherein the command indicates a read operation.

7. The operating method of claim 6, further comprising:
based on receiving the first read response, obtaining the first logical block address with reference to the first map data based on the first physical block address; and
sending, to the host device through the first interface, a second read response including the first logical block address and the first user data.

8. The operating method of claim 1, further comprising receiving, from the first storage device through the second interface, a first write response comprising write map data indicating that the second user data are stored in the first storage device, based on sending the second request to the first storage device,
wherein the command indicates a write operation and the first request further includes the second user data corresponding to the command.

9. The operating method of claim 8, further comprising:
based on receiving the first write response, updating the first map data based on the write map data;
obtaining, based on the first physical block address, the first logical block address with reference to the updated first map data; and
sending a second write response comprising the first logical block address to the host device through the first interface.

10. The operating method of claim 9, further comprising:
based on sending the second write response to the host device, receiving a power-off request from the host device through the first interface;
based on receiving the power-off request, sending the updated first map data to the first storage device through the second interface; and
based on receiving the power-off request, sending the second map data dedicated for the second storage device to the second storage device through the second interface.

11. The operating method of claim 1, wherein the receiving the first request comprises:
receiving a first initialization request from the host device through the first interface;
based on receiving the first initialization request, sending a second initialization request to the first storage device through the second interface;
based on receiving the first initialization request, sending a third initialization request to the second storage device through the second interface;
based on sending the second initialization request, receiving a first initialization response comprising first capacity information of the first storage device and the first map data through the second interface;
based on sending the third initialization request, receiving a second initialization response comprising second capacity information of the second storage device and the second map data dedicated for the second storage device through the second interface;
based on receiving the first initialization response and the second initialization response, sending a third initialization response to the host device through the first interface; and
based on sending the third initialization response, receiving the first request comprising the command and the first logical block address from the host device through the first interface.

12. A computing system comprising:
a host device comprising a compute express link (CXL) host interface circuit;
a first storage device comprising a first CXL storage interface circuit, a first NAND interface circuit, a first non-volatile memory (NVM), first map data, and first user data;
a second storage device comprising a second CXL storage interface circuit, a second NAND interface circuit, a second NVM, second map data, and second user data;
a memory device storing a mapping table including the first map data and the second map data, the first map data being dedicated for the first storage device and for managing data stored in the first storage device and the second map data being dedicated for the second storage device and for managing data stored in the second storage device, the memory device comprising a CXL memory interface circuit, a memory manager, a buffer memory interface circuit, and a buffer memory;
a first interface configured to communicate with the host device via the CXL host interface circuit and the memory device via the CXL memory interface circuit; and
a second interface configured to communicate with the first storage device via the first CXL storage interface circuit using CXL.mem characterized by a memory coherency, the second storage device via the second CXL storage interface circuit using CXL.mem characterized by the memory coherency, and the memory device via the CXL memory interface circuit, the second interface being a compute express link (CXL) interface, wherein the first interface and the second interface are implemented by a CXL switch,
wherein the memory device is configured to:
receive, from the host device through the first interface, a first request comprising a command and a first logical block address,
obtain, based on the first logical block address, a first physical block address with reference to the first map data of the mapping table, and
send, to the first storage device through the second interface, a second request comprising the first physical block address and the command, the second interface being different from the first interface and being a compute express link (CXL) interface.

13. The computing system of claim 12, wherein the first storage device includes a first CXL controller configured to communicate by using a CXL protocol, the second storage device includes a second CXL controller configured to communicate by using the CXL protocol, and the memory device includes a third CXL controller configured to communicate by using the CXL protocol.

14. The computing system of claim 12, wherein the first storage device is configured to:
based on receiving the second request, read the first user data stored in an area corresponding to the first physical block address; and send, to the memory device through the second interface, a first read response comprising the first user data and the first physical block address, and wherein the command indicates a read operation.

15. The computing system of claim 14, wherein the memory device is further configured to:

based on receiving the first read response through the second interface, obtain the first logical block address with reference to the first map data of the mapping table based on the first physical block address; and send, to the host device through the first interface, a second read response comprising the first logical block address and the first user data.

16. The computing system of claim 12, wherein the first storage device is configured to:

based on sending the second request to the first storage device, store the second user data corresponding to the command in an area corresponding to the first physical block address through the second interface; and send, to the memory device, a first write response comprising write map data indicating that the second user data are stored in the area corresponding to the first physical block address, and wherein the command indicates a write operation.

17. The computing system of claim 16, wherein the memory device is further configured to:

based on receiving the first write response the second interface, update the first map data based on the write map data;

obtain the first logical block address from the first physical block address with reference to the updated first map data; and send, to the host device through the first interface, a second write response comprising the first logical block address.

18. The computing system of claim 17, wherein the memory device is further configured to:

based on sending the second write response to the host device through the first interface, receive a power-off request from the host device;

based on receiving the power-off request, send the updated first map data to the first storage device through the second interface; and based on receiving the power-off request, send the second map data dedicated for the second storage device to the second storage device through the second interface.

19. The computing system of claim 12, wherein the first storage device and the second storage device are connected in a cascade structure using the second interface.

20. A system comprising:

a first storage device comprising a first compute express link (CXL) controller configured to communicate by using a plurality of CXL protocols;

a second storage device comprising a second CXL controller configured to communicate by using the plurality of CXL protocols;

a CXL switch; and a volatile memory device comprising a third CXL controller configured to communicate by using the plurality of CXL protocols, configured to receive a first request and a second request from a host device through a first interface, and configured to transmit, through a second interface, the first request to the first storage device and the second request to the second storage device, wherein the second interface is a CXL interface that is different from the first interface, wherein the volatile memory device includes a mapping table having address information for the first storage device and the second storage device, wherein the volatile memory device is configured to transmit a first physical address to the first storage device according to the first request and a second physical address to the second storage device according to the second request, based on the mapping table, wherein the second interface interfaces to the CXL switch, wherein the first storage device comprises a first direct memory access (DMA) engine, wherein the second storage device comprises a second DMA engine, wherein the first DMA engine using a peer-to-peer protocol (P2P) communication, without interference or control from the host device, is configured to transfer first map data for managing data stored in the first storage device from the first storage device to the mapping table in a buffer of the volatile memory device, and wherein the second DMA engine using the P2P communication is configured to transfer second map data for managing data stored in the second storage device from the second storage device to the mapping table in the buffer of the volatile memory device, wherein the host device comprises a CXL host interface circuit, wherein the first storage device comprises a first CXL storage interface circuit, a first NAND interface circuit, a first non-volatile memory (NVM), first map data, and first user data, wherein the second storage device comprises a second CXL storage interface circuit, a second NAND interface circuit, a second NVM, second map data, and second user data, wherein the volatile memory device comprises: a CXL memory interface circuit, a memory manager, a buffer memory interface circuit, and a buffer memory, wherein the first interface is configured to communicate with the host device via the CXL host interface circuit and the volatile memory device via the CXL memory interface circuit, and wherein the second interface is configured to communicate with the first storage device via the first CXL storage interface circuit using CXL.mem characterized by a memory coherency, the second storage device via the second CXL storage interface circuit using CXL.mem characterized by the memory coherency, and the volatile memory device via the CXL memory interface circuit, and wherein the first interface and the second interface are implemented by a CXL switch.

* * * * *